(12) United States Patent
Hausmanns et al.

(10) Patent No.: US 12,528,857 B2
(45) Date of Patent: Jan. 20, 2026

(54) NUTRITIONALLY-OPTIMIZED COLLAGEN PEPTIDE

(71) Applicant: Gelita AG, Eberbach (DE)

(72) Inventors: Stephan Hausmanns, Heidelberg (DE); Hans-Ulrich Frech, Weinheim (DE); Steffen Oesser, Glücksburg (DE); Martin Hahn, Gronau (DE); Suzane Leser, Cambridge (GB)

(73) Assignee: GELITA AG, Eberbach (DE)

( * ) Notice: Subject to any disclaimer, the term of this patent is extended or adjusted under 35 U.S.C. 154(b) by 828 days.

(21) Appl. No.: 17/733,886

(22) PCT Filed: Oct. 28, 2020

(86) PCT No.: PCT/EP2020/080308
§ 371 (c)(1),
(2) Date: Apr. 29, 2022

(87) PCT Pub. No.: WO2021/083968
PCT Pub. Date: May 6, 2021

(65) Prior Publication Data
US 2024/0150434 A1    May 9, 2024

(30) Foreign Application Priority Data

Oct. 31, 2019 (DE) .......................... 102019216872.8
Dec. 20, 2019 (DE) .......................... 102019220420.1
Aug. 24, 2020 (DE) .......................... 102020210725.4

(51) Int. Cl.
| | | |
|---|---|---|
| C07K 14/78 | (2006.01) | |
| A61K 8/65 | (2006.01) | |
| A61Q 19/00 | (2006.01) | |
| A61K 38/00 | (2006.01) | |

(52) U.S. Cl.
CPC .............. *C07K 14/78* (2013.01); *A61K 8/65* (2013.01); *A61Q 19/00* (2013.01); *A61K 38/00* (2013.01)

(58) Field of Classification Search
CPC . C07K 14/78; A61K 8/65; A23J 3/342; A23L 33/17
See application file for complete search history.

(56) References Cited

U.S. PATENT DOCUMENTS

| | | |
|---|---|---|
| 8,778,422 B2 | 7/2014 | Oesser |
| 9,072,724 B2 | 7/2015 | Hausmanns et al. |
| 10,364,283 B2 | 7/2019 | Oesser et al. |

FOREIGN PATENT DOCUMENTS

| | | |
|---|---|---|
| CN | 109880868 A | 6/2019 |
| EP | 2640352 B1 | 9/2013 |
| WO | 2001012659 A2 | 2/2001 |
| WO | 2014072235 A1 | 5/2014 |
| WO | 2010149596 A1 | 12/2019 |

OTHER PUBLICATIONS https://www.uniprot.org/uniprotkb/P20908/entry (accessed Dec. 23, 2024) (Year: 1991).*
De Wet et al. Organization of the human pro-alpha 2(I) collagen gene J Biol Chem 262 (33), 16032-16036 (1987) Accession P08123 (Year: 1987).*
De Wet et al. Organization of the human pro-alpha 2(I) collagen gene. J Biol Chem 262 (33), 16032-16036 (1987). Accession P08123 (Year: 1987) (Year: 1987).*
Paul et al., "Significant amounts of functional collagen peptides can be incorporated in the diet while maintaining indispensable amino acid balance", Nutrients, 2019, 11, 1079, 10 pages.
Trumbo et al., "Dietary reference intakes for energy, carbohydrate, fiber, fat, fatty acids, cholesterol, protein and amino acids", Journal of the American Dietetic Association, vol. 102, issue 11, pp. 1621-1630, Nov. 1, 2002.
Zdzieblik et al., "Collagen peptide supplementation in combination with resistance training improves body composition and increases muscle strength in elderly sarcopenic men: a randomised controlled trial", British Journal of Nutrition, 2015, 114, pp. 1237-1245.

* cited by examiner

*Primary Examiner* — Jeanette M Lieb
*Assistant Examiner* — David Paul Bowles
(74) *Attorney, Agent, or Firm* — Sheppard Mullin Richter & Hampton LLP

(57) ABSTRACT

The present invention relates to a nutritionally optimized synthetic or recombinant collagen peptide comprising at least one amino acid sequence motif (glycine-X-Y)$_n$, and the collagen peptide according to the invention for use in a method for therapeutic treatment of the human or animal body and products containing the collagen peptide according to the invention.

Figure 1A:
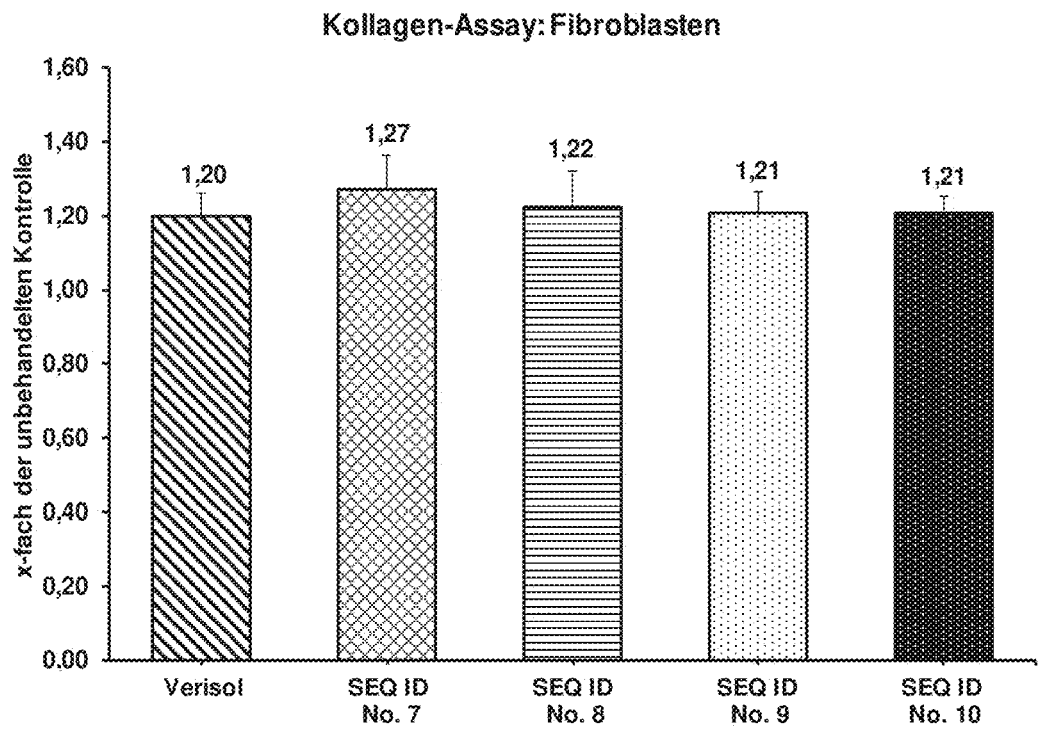

15 Claims, 1 Drawing Sheet
Specification includes a Sequence Listing.

NUTRITIONALLY-OPTIMIZED COLLAGEN PEPTIDE

CROSS-REFERENCE TO RELATED APPLICATIONS

This application is a continuation of International Application PCT/EP2020/080308, filed Oct. 28, 2020, which claims priority to German Patent Applications 10 2019 216 872.8, filed Oct. 31, 2019, 10 2019 220 420.1, filed Dec. 20, 2019, and 10 2020 210 725.4, filed Aug. 24, 2020, the content of each of which is incorporated herein by reference in its entirety.

SEQUENCE LISTING

The instant application contains a sequence listing which has been submitted in ASCII format via EFS-Web and is hereby incorporated by reference in its entirety. Said ASCII copy, created Apr. 29, 2022, is named 72PD-354215-US-_SL.txt and is 83,594 bytes in size.

DESCRIPTION

The present invention relates to a nutritionally optimized synthetic or recombinant collagen peptide comprising at least one amino acid sequence motif (glycine-X-Y) n, and the collagen peptide according to the invention for use in a method for therapeutic treatment of the human or animal body and products containing the collagen peptide according to the invention.

Collagen is an extracellular structural protein found in animals, for example, in mammals, birds, and fish. It is usually found there in the connective tissue, in particular, as part of the extracellular matrix. Tendons, ligaments, cartilage and bones are particularly rich in collagen. However, collagens are not found in plants and single-celled organisms.

Collagens occur in different, structurally and functionally different types and differ in terms of their structure, function, and origin, among other things. The polypeptide chains that make up collagen are individually synthesized in the cell on the ribosomes of the endoplasmic reticulum in the form of larger precursor molecules and have extensive repetitive (Gly-X-Y) n sequences, where X and Y may be any amino acid, but usually proline and 4-hydroxyproline.

These precursor polypeptide chains are post-translationally hydroxylated on proline and lysine residues of the polypeptide chain in the endoplasmic reticulum while forming hydroxyproline and hydroxylysine residues. The hydroxylation serves to stabilize neighboring collagen polypeptide chains of the right-handed triple helix that forms in the cell, each made up of three of the precursor polypeptide chains (procollagen).

The procollagen thus formed is glycosylated intracellularly, secreted by the cell in the glycosylated triple-helical form (tropocollagen), and collagen is subsequently formed by peptidase-mediated cleavage of the terminal residues. In the course of a fibrillogenesis process, this accumulates to form collagen fibrils, which are then covalently cross-linked to form collagen fibers.

Collagen is often used in denatured form, then known as gelatin, or its hydrolysates.

Even with a view to the increased demands in large parts of the population with regard to health, attractive outward appearance, mobility, and fitness, in each case also in advanced age, there is still a great need for food and preparations for improvement and/or the maintenance of health.

In addition to the positive effects of collagen peptides on human health, there is also a particular interest in providing the body with the nutrients it needs to maintain or improve health quickly, easily and efficiently. For example, a wide range of bodily functions can be impaired if the body is not supplied via nutrition with amino acids, or not supplied with amino acids in sufficient quantities which the body itself is not able to synthesize in general or in a certain life situation. The amino acids essential for the human body include isoleucine, leucine, lysine, methionine, phenylalanine, threonine, tryptophan, valine, histidine, cysteine and tyrosine, whereby cysteine and tyrosine are not produced de novo in the human body, but can be synthesized starting from methionine/homocysteine or phenylalanine. The amino acids alanine, asparagine, aspartic acid, glutamine, glutamic acid, glycine, proline and serine are considered non-essential for the human body.

The object of the present invention is to provide a nutritionally optimized synthetic or recombinant collagen peptide, in particular to provide a synthetic or recombinant collagen peptide which supplies the human body with a sufficient amount of the essential amino acids.

The present invention solves the problem on which it is based by the subject matter of the independent claims, in particular by providing a synthetic or recombinant collagen peptide comprising at least one amino acid sequence motif (glycine-X-Y)$_n$, wherein X and Y, one for each amino acid sequence motif (glycine-X-Y), are naturally occurring amino acids, wherein n is an integer >1, and wherein the collagen peptide contains at least 1.02% sulfur-containing amino acids, at least 0.73% histidine, at least 1.02% isoleucine, at least 2.24% leucine, at least 2, 07% lysine, at least 1.1% threonine, at least 0.28% tryptophan, at least 1.91% tyrosine and/or phenylalanine, and at least 1.3% valine (in each case % by weight based on the total weight of the collagen peptide).

The provision of the collagen peptide according to the invention advantageously allows the supply of the human body with all essential amino acids, in particular the supply of the human body with all essential amino acids in a sufficient, preferably recommended, amount.

In a preferred embodiment of the present invention, the collagen peptide comprises 10 to 30%, preferably 12 to 28%, preferably 14 to 26%, particularly preferably 16 to 24% glycine (in each case % by weight based on the total weight of the collagen peptide). The collagen peptide preferably comprises at least 10%, preferably at least 12%, preferably at least 14%, preferably at least 16%, preferably at least 18%, preferably at least 20% glycine (in each case % by weight based on the total weight of the collagen peptide).

In a further preferred embodiment of the present invention, the collagen peptide comprises 20 to 45%, preferably 25 to 40%, preferably 30 to 40%, particularly preferably 30 to 35% glycine (based on the total amount of amino acids in the collagen peptide). The collagen peptide preferably comprises at least 15%, preferably at least 17.5%, preferably at least 20%, preferably at least 22.5%, preferably at least 25%, preferably at least 27.5%, preferably at least 30% glycine (based on the total amount of the amino acids of the collagen peptide).

The collagen peptide preferably comprises 10 to 30%, preferably 12.5 to 27.5%, particularly preferably 15 to 25%, proline (in each case % by weight based on the total weight of the collagen peptide). In a further preferred embodiment, the collagen peptide comprises at least 10%, preferably at least 12.5%, preferably at least 15%, proline (in each case % by weight based on the total weight of the collagen peptide).

The collagen peptide particularly preferably comprises 10 to 30%, preferably 12.5 to 27.5%, particularly preferably 15 to 25% proline (based on the total amount of amino acids in the collagen peptide). In a further preferred embodiment, the collagen peptide comprises at least 10%, preferably at least 12.5%, preferably at least 15%, proline (based on the total amount of amino acids in the collagen peptide).

In a preferred embodiment of the present invention, X and Y for each amino acid sequence motif (glycine-XY) are each an amino acid selected from the group consisting of isoleucine, leucine, lysine, methionine, phenylalanine, threonine, tryptophan, valine, histidine, cysteine, tyrosine and proline, especially consisting of isoleucine, leucine, lysine, methionine, phenylalanine, threonine, tryptophan, valine, histidine, cysteine and tyrosine.

In a further preferred embodiment of the present invention, the collagen peptide comprises one of the amino acid sequences SEQ ID NO: 1 or 2.

In a preferred embodiment of the present invention, the collagen peptide comprises one of the amino acid sequences SEQ ID NO: 3 or 4.

In a further preferred embodiment of the present invention, the collagen peptide comprises an amino acid sequence selected from the group consisting of SEQ ID NO: 7 to 10, preferably consisting of one of these amino acid sequences.

The collagen peptide preferably includes one of the amino acid sequences SEQ ID NO: 5 to 28, preferably SEQ ID NO: 5 to 22, in particular SEQ ID NO: 5 to 10 and 13 to 22. The collagen peptide particularly preferably consists of an amino acid sequence of SEQ ID NO: 5 to 28, preferably SEQ ID NO: 5 to 22, in particular SEQ ID NO: 5 to 10 and 13 to 22.

Particularly preferably, the variable positions X and/or Y of the at least one amino acid sequence motif (glycine-X-Y)$_n$ occurring in the collagen peptide are each occupied by an essential amino acid.

In a further embodiment, the collagen peptide according to the invention has a protein digestibility corrected amino acid score (PDCAAS) of at least 0.4, preferably at least 0.5, preferably at least 0.6, preferably at least 0.7, preferably at least 0.8, preferably at least 0.9, particularly preferably 1, preferably determined using Table 1, preferably determined using Table 2.

It can also be provided that in each amino acid sequence motif occurring in the collagen peptide according to the invention (glycine-X-Y), X and/or Y are different amino acids selected from the group consisting of isoleucine, leucine, lysine, methionine, phenylalanine, threonine, tryptophan, valine, histidine, cysteine, tyrosine and proline, in particular consisting of isoleucine, leucine, lysine, methionine, phenylalanine, threonine, tryptophan, valine, histidine, cysteine and tyrosine. For example, in at least one amino acid sequence motif (glycine-X-Y) of the collagen peptide X and/or Y according to the invention, there may be a specific amino acid selected from the group consisting of isoleucine, leucine, lysine, methionine, phenylalanine, threonine, tryptophan, valine, histidine, cysteine, tyrosine and proline, in particular consisting of isoleucine, leucine, lysine, methionine, phenylalanine, threonine, tryptophan, valine, histidine, cysteine and tyrosine, and in at least one further amino acid sequence motif (glycine-X-Y) of the collagen peptide X and/or Y according to the invention there may be another amino acid selected from the group consisting of isoleucine, leucine, lysine, methionine, phenylalanine, threonine, tryptophan, valine, histidine, cysteine, tyrosine and proline, in particular consisting of isoleucine, leucine, lysine, methionine, phenylalanine, threonine, tryptophan, valine, histidine, cysteine and tyrosine.

In a preferred embodiment of the present invention, at least 50%, preferably at least 60%, preferably at least 70%, preferably at least 80%, preferably at least 90% of the amino acid sequence motifs (glycine-X-Y) present in the collagen peptide according to the invention contain at least one essential amino acid, in particular at least one amino acid selected from the group consisting of isoleucine, leucine, lysine, methionine, phenylalanine, threonine, tryptophan, valine, histidine, cysteine and tyrosine. Particularly preferably, at least one essential amino acid, in particular at least one amino acid selected from the group consisting of isoleucine, leucine, lysine, methionine, phenylalanine, threonine, tryptophan, valine, histidine, cysteine, and tyrosine, is present in each amino acid sequence motif (glycine-X-Y) present in the collagen peptide according to the invention and tyrosine.

In a particularly preferred embodiment, one of the variable sites X and Y of at least one amino acid sequence motif (glycine-X-Y) is selected from the group consisting of proline and hydroxyproline and the other variable site of the amino acid sequence motif (glycine-X-Y) is selected from the group consisting of natural occurring amino acids, preferably selected from the group consisting of isoleucine, leucine, lysine, methionine, phenylalanine, threonine, tryptophan, valine, histidine, cysteine and tyrosine. According to a preferred embodiment of the present invention, X is proline, preferably hydroxyproline, and Y is an amino acid selected from the group consisting of naturally occurring amino acids, preferably selected from the group consisting of isoleucine, leucine, lysine, methionine, phenylalanine, threonine, tryptophan, valine, histidine, cysteine and tyrosine. In a further preferred embodiment of the present invention, Y is proline, preferably hydroxyproline, and X is an amino acid selected from the group consisting of naturally occurring amino acids, preferably selected from the group consisting of isoleucine, leucine, lysine, methionine, phenylalanine, threonine, tryptophan, valine, histidine, cysteine and tyrosine.

Preferably in at least 10%, preferably at least 20%, preferably at least 30%, preferably at least 40%, preferably at least 50%, preferably at least 60%, preferably at least 70%, preferably at least 80%, preferably at least 90%, preferably at least 95% of the amino acid sequence motifs (glycine-X-Y) occurring in the collagen peptide according to the invention, one of the variable sites X and Y is selected from proline and hydroxyproline and the other variable site of the amino acid sequence motif (glycine-X-Y) is selected from an amino acid selected from the group consisting of isoleucine, leucine, lysine, methionine, phenylalanine, threonine, tryptophan, valine, histidine, cysteine and tyrosine.

In all of the amino acid sequence motifs (glycine-X-Y) occurring in the collagen peptide according to the invention, one of the variable sites X and Y is particularly preferably selected from proline and hydroxyproline and the other variable site of the amino acid sequence motif (glycine-XY) is selected from the group consisting of isoleucine, leucine, lysine, methionine, phenylalanine, threonine, tryptophan, valine, histidine, cysteine and tyrosine.

In another preferred embodiment, n is an integer ≥2, preferably ≥3, preferably ≥4, preferably ≥5, preferably 26, preferably 27, preferably 28, preferably 29, preferably ≥10, preferably ≥15, preferably ≥20, preferably ≥25, preferably ≥30, preferably ≥35. n is particularly preferably an integer in the range from 2 to 350, preferably 3 to 350, preferably 4 to 350, preferably 5 to 350, preferably 5 to 300, preferably 10 to 250, preferably 10 to 200, preferably 15 to 150, preferably 15 to 100, preferably 20 to 90, preferably 25 to 80, preferably 30 to 70, preferably 35 to 60, preferably 40 to 50.

In a particularly preferred embodiment of the present invention, at least 20%, preferably at least 30%, preferably at least 40%, preferably at least 50%, preferably at least 60%, preferably at least 70%, preferably at least 80%, preferably at least 90%, preferably at least 95% of the amino acid sequence of the collagen peptide according to the invention consists of the amino acid sequence motif (glycine-X-Y) (in each case based on the number of amino acids). The amino acid sequence of the collagen peptide according to the invention particularly preferably consists of the amino acid sequence motif (glycine-XY) n, where n is an integer ≥1, preferably ≥2, preferably ≥3, preferably ≥4, preferably ≥5, preferably ≥6, preferably ≥7, preferably ≥8, preferably ≥9, preferably ≥10, preferably ≥15, preferably ≥20, preferably ≥25, preferably ≥30, preferably ≥35.

The collagen peptide preferably comprises the amino acid sequence motif (glycine-X-Y)$_n$ at least twice, preferably at least three times, preferably at least four times, preferably at least five times, preferably at least 10 times, preferably at least 15 times, preferably at least 20 times, preferably at least 30 times, preferably at least 40 times, preferably at least 50 times, preferably at least 60 times, preferably at least 70 times, preferably at least 80 times, preferably at least 90 times, preferably at least 100 times.

Accordingly, it is conceivable according to the invention, for example, for the amino acid sequence motif (glycine-XY)$_n$ to occur m times in the collagen peptide, wherein the motif is repeated n times in each case, which is why: m (glycine-XY) n. In each individual amino acid sequence motif (glycine-X-Y), X and Y can each be selected independently of one another from the group consisting of naturally occurring amino acids, preferably from the group consisting of isoleucine, leucine, lysine, methionine, phenylalanine, threonine, tryptophan, valine, histidine, cysteine, tyrosine and proline, particularly preferably from the group consisting of isoleucine, leucine, lysine, methionine, phenylalanine, threonine, tryptophan, valine, histidine, cysteine and tyrosine. For example, X and/or Y in a first amino acid sequence motif (glycine-X-Y) occurring in the amino acid sequence of the collagen peptide can be different from X and/or Y in a second amino acid sequence motif (glycine-X-Y). It is also provided according to the invention that the amino acid sequence motif (glycine-X-Y) is repeated n times, wherein in each of the consecutive amino acid sequence motifs (glycine-X-Y) X and/or Y repeated n times, a different amino acid is selected from the group consisting of naturally occurring ones amino acids, preferably from the group consisting of isoleucine, leucine, lysine, methionine, phenylalanine, threonine, tryptophan, valine, histidine, cysteine, tyrosine and proline, particularly preferably from the group consisting of isoleucine, leucine, lysine, methionine, phenylalanine, threonine, tryptophan, valine, histidine, cysteine and tyrosine. It can also be provided according to the invention that X and/or Y, in each amino acid sequence motif repeated n times, is the same amino acid selected from the group consisting of naturally occurring amino acids, preferably from the group consisting of isoleucine, leucine, lysine, methionine, phenylalanine, threonine, tryptophan, valine, histidine, cysteine, tyrosine and proline, particularly preferably from the group consisting of isoleucine, leucine, lysine, methionine, phenylalanine, threonine, tryptophan, valine, histidine, cysteine and tyrosine.

In a further preferred embodiment, X and Y of each amino acid sequence motif (glycine-X-Y) occurring in the collagen peptide according to the invention are different amino acids selected from the group consisting of naturally occurring amino acids, preferably from the group consisting of isoleucine, leucine, lysine, methionine, phenylalanine, threonine, tryptophan, valine, histidine, cysteine, tyrosine and proline, particularly preferably from the group consisting of isoleucine, leucine, lysine, methionine, phenylalanine, threonine, tryptophan, valine, histidine, cysteine and tyrosine.

In a preferred embodiment of the present invention, the amino acid sequence of the collagen peptide according to the invention is homologous, in particular identical, to an amino acid sequence occurring in naturally occurring collagen, in particular collagen of types I, II, III, IV, V, VI, VII, VIII, IX, X, XI, XII, XIII, XIV, XV, XVI, XVII, XVIII, XIX, XX, XXI, XXII, XXIII, XXIV, XXV, XXVI, XXVII, preferably type I, II or III, preferably type I, preferably type II, preferably type III, of at least 20%, preferably at least 25%, preferably at least 30%, preferably at least 35%, preferably at least 40%, preferably at least 45%, preferably at least 50%, preferably at least 55%, preferably at least 60%, preferably at least 65%, preferably 70%, preferably at least 75%, preferably at least 80%, preferably at least 90%.

In a further preferred embodiment, the amino acid sequence of the collagen peptide according to the invention is the amino acid sequence of a naturally occurring collagen, in particular the amino acid sequence of a naturally occurring collagen from vertebrates, in particular from fish, amphibians, reptiles, birds and mammals, in particular an amino acid sequence occurring in pigs, cattle, rodents, kangaroos, horses, donkeys, sheep or from invertebrates, in particular jellyfish, preferably around a collagen type I, II, III, IV, V, VI, VII, VIII, IX, X, XI, XII, XIII, XIV, XV, XVI, XVII, XVIII, XIX, XX, XXI, XXII, XXIII, XXIV, XXV, XXVI, XXVII, preferably type I, II or III, preferably type I, preferably type II, preferably type III, wherein non-essential amino acids are replaced by essential amino acids in the amino acid sequence of the collagen peptide according to the invention.

Preferably, in the amino acid sequence of the collagen peptide according to the invention, at least 30%, preferably at least 40%, preferably at least 50%, preferably at least 60%, preferably at least 70%, preferably at least 80%, preferably at least 90% of the non-essential amino acids in the amino acid sequence of a naturally occurring collagen are replaced by essential amino acids (each based on the number of amino acids). The glycines, prolines and/or 4-hydroxyprolines present in the amino acid sequence of the collagen peptide according to the invention, in particular in the amino acid sequence motifs (Gly-X-Y), of the naturally occurring collagen, are particularly preferably not exchanged.

In a preferred embodiment of the present invention, the collagen peptide comprises at least 15%, preferably at least 20%, preferably at least 25%, preferably at least 30%, preferably at least 35%, preferably at least 40%, preferably at least 45%, preferably at least 50%, preferably at least 60% (in each case % by weight based on the total weight of the collagen peptide) amino acids selected from the group consisting of isoleucine, leucine, lysine, methionine, phenylalanine, threonine, tryptophan, valine, histidine, cysteine and tyrosine.

In a further preferred embodiment of the present invention, the collagen peptide comprises at least 25%, preferably at least 30%, preferably at least 35%, preferably at least 40%, preferably at least 45%, preferably at least 50%, preferably at least 60% (in each case based on the total amount of the amino acids of the collagen peptide) amino acids selected from the group consisting of isoleucine, leucine, lysine, methionine, phenylalanine, threonine, tryptophan, valine, histidine, cysteine and tyrosine.

According to the invention, the collagen peptide according to the present invention has an amount of essential amino acids, in particular amino acids selected from the group consisting of isoleucine, leucine, lysine, methionine, phenylalanine, threonine, tryptophan, valine, histidine, cysteine and tyrosine, which corresponds to the nutritional recommendations for a relevant target group. The collagen peptide according to the present invention particularly preferably has the amino acids isoleucine, leucine, lysine, methionine, phenylalanine, threonine, tryptophan, valine, histidine, cysteine and tyrosine, each in an amount that corresponds to the nutritional recommendations for a child, in particular a child of the age of 1 to 3 years. Preferably, the collagen peptide according to the present invention has the amino acids isoleucine, leucine, lysine, methionine, phenylalanine, threonine, tryptophan, valine, histidine, cysteine and tyrosine, each in an amount that corresponds to the nutritional recommendations for a human being over 3 years of age, in particular over 18 years of age.

Particularly preferably, the collagen peptide according to the present invention has the amino acids isoleucine, leucine, lysine, methionine, phenylalanine, threonine, tryptophan, valine, histidine, cysteine and tyrosine in an amount that results in a PDCAAS of the collagen peptide of at least 0.4, preferably at least 0.5, preferably at least 0.6, preferably at least 0.7, preferably at least 0.75, preferably at least 0.8, preferably at least 0.85, preferably at least 0.9, preferably at least 0.95, preferably 1, preferably determined according to Table 1, preferably determined according to Table 2.

In a preferred embodiment, the collagen peptide comprises at least 1.27% sulfur-containing amino acids, at least 0.91% histidine, at least 1.27% isoleucine, at least 2.79% leucine, at least 2.59% lysine, at least 1.37% threonine, at least 0.36% tryptophan, at least 2.39% tyrosine and/or phenylalanine, and at least 1.63% valine (in each case % by weight based on the total weight of the collagen peptide). Preferably, the collagen peptide comprises 1.27 to 4.0% sulfur-containing amino acids, 0.91 to 4.0% histidine, 1.27 to 5.0% isoleucine, 2.79 to 16.0% leucine, 2.59 to 7.8% lysine, 1.37 to 5.8% threonine, 0.36 to 3.0% tryptophan, 2.39 to 7.7% tyrosine and/or phenylalanine, and 1.63 to 5.0% valine (in each case % by weight based on the total weight of the collagen peptide).

In a further preferred embodiment of the present invention, the collagen peptide comprises at least 1.52% sulfur-containing amino acids, at least 1.1% histidine, at least 1.52% isoleucine, at least 3.35% leucine, at least 3.11% lysine, at least 1.65% threonine, at least 0.43% tryptophan, at least 2.87% tyrosine and/or phenylalanine, and at least 1.95% valine (in each case % by weight based on the total weight of the collagen peptide). Preferably, the collagen peptide comprises 1.52 to 4.0% sulfur-containing amino acids, 1.1 to 4.0% histidine, 1.52 to 5.0% isoleucine, 3.35 to 16.0% leucine, 3.11 to 7.8% lysine, 1.65 to 5.8% threonine, 0.43 to 3.0% tryptophan, 2.87 to 7.7% tyrosine and/or phenylalanine, and 1.95 to 5.0% valine (in each case % by weight based on the total weight of the collagen peptide).

The collagen peptide preferably comprises at least 1.78% sulfur-containing amino acids, at least 1.28% histidine, at least 1.78% isoleucine, at least 3.91% leucine, at least 3.63% lysine, at least 1.92% threonine, at least 0.5% tryptophan, at least 3.34% tyrosine and/or phenylalanine, and at least 2.28% valine (in each case % by weight based on the total weight of the collagen peptide). Particularly preferably, the collagen peptide comprises 1.78 to 4.0% sulfur-containing amino acids, 1.28 to 4.0% histidine, 1.78 to 5.0% isoleucine, 3.91 to 16.0% leucine, 3.63 bis 7.8% lysine, 1.92 to 5.8% threonine, 0.5 to 3.0% tryptophan, 3.34 to 7.7% tyrosine and/or phenylalanine, and 2.28 to 5.0% valine (in each case % by weight based on the total weight of the collagen peptide).

According to a further preferred embodiment, the collagen peptide comprises at least 2.03% sulfur-containing amino acids, at least 1.46% histidine, at least 2.03% isoleucine, at least 4.47% leucine, at least 4.15% lysine, at least 2.2% threonine, at least 0.57% tryptophan, at least 3.82% tyrosine and/or phenylalanine, and at least 2.6% valine (in each case % by weight based on the total weight of the collagen peptide). Preferably, the collagen peptide comprises 2.03 to 4.0% sulfur-containing amino acids, 1.46 to 4.0% histidine, 2.03 to 5.0% isoleucine, 4.47 to 16.0% leucine, 4.15 to 7.8% lysine, 2.2 to 5.8% threonine, 0.57 to 3.0% tryptophan, 3.82 to 7.7% tyrosine and/or phenylalanine, and 2.6 to 5.0% valine (in each case % by weight based on the total weight of the collagen peptide).

Particularly preferably, the collagen peptide comprises at least 2.29% sulfur-containing amino acids, at least 1.65% histidine, at least 2.29% isoleucine, at least 5.03% leucine, at least 4.66% lysine, at least 2.47% threonine, at least 0 64% tryptophan, at least 4.3% tyrosine and/or phenylalanine, and at least 2.93% valine (in each case % by weight based on the total weight of the collagen peptide). Preferably, the collagen peptide comprises 2.29 to 4.0% sulfur-containing amino acids, 1.65 to 4.0% histidine, 2.29 to 5.0% isoleucine, 5.03 to 16.0% leucine, 4.66 to 7.8% lysine, 2.47 to 5.8% threonine, 0.64 to 3.0% tryptophan, 4.3 to 7.7% tyrosine and/or phenylalanine, and 2.93 to 5.0% valine (in each case % by weight based on the total weight of the collagen peptide).

In a further preferred embodiment of the present invention, the collagen peptide comprises at least 2.54% sulfur-containing amino acids, at least 1.83% histidine, at least 2.54% isoleucine, at least 5.59% leucine, at least 5.18% lysine, at least 2.74% threonine, at least 0.71% tryptophan, at least 4.78% tyrosine and/or phenylalanine, and at least 3.25% valine (in each case % by weight based on the total weight of the collagen peptide). Preferably, the collagen peptide comprises 2.54 to 4.0% sulfur-containing amino acids, 1.83 to 4.0% histidine, 2.54 to 5.0% isoleucine, 5.59 to 16.0% leucine, 5.18 to 7.8% lysine, 2.74 to 5.8% threonine, 0.71 to 3.0% tryptophan, 4.78 to 7.7% tyrosine and/or phenylalanine, and 3.25 to 5.0% valine (% by weight based on the total weight of the collagen peptide).

In a further preferred embodiment of the present invention, the collagen peptide according to the invention is characterized by a particularly high content of the essential amino acid leucine, which is important for muscle building. According to this embodiment, the collagen peptide according to the invention comprises at least 8%, preferably at least 9%, preferably at least 10%, preferably at least 11%, particularly preferably at least 12% leucine (in each case % by weight based on the total weight of the collagen peptide).

In a preferred embodiment, the collagen peptide according to the invention comprises 6 to 20%, preferably 8 to 18%, particularly preferably 10 to 16% leucine (in each case % by weight based on the total weight of the collagen peptide).

In a further embodiment, the present invention relates to a collagen peptide, in particular a collagen peptide, which is a synthetic or recombinant collagen peptide and comprises at least one amino acid sequence motif (glycine-X-Y) n, wherein X and Y are a naturally occurring amino acid for each amino acid sequence motif (glycine-X-Y) independent of one another, wherein n is an integer >1, and wherein the collagen peptide contains at least 1.02% sulfur-containing amino acids, at least 0.73% histidine, at least 1.02% isoleucine, at least 2.24% leucine, at least 2, 07% lysine, at least 1.1% threonine, at least 0.28% tryptophan, at least 1.91% tyrosine and/or phenylalanine, and at least 1.3% valine (in each case % by weight based on the total weight of the collagen peptide), wherein the collagen peptide is a synthetic or recombinant collagen peptide and comprises at least one amino acid sequence motif (glycine-X-Y) n, wherein X and Y, each independently from one another, are naturally occurring amino acids for each amino acid sequence motif (glycine-X-Y), wherein n is an integer >1, and wherein the collagen peptide contains at least 1.1% sulfur-containing amino acids, at least 0.8% histidine, at least 1.2% isoleucine, at least 2.7% leucine, at least 2.4% lysine, at least 1.4% threonine, at least 0.5% tryptophan, at least 2.6% tyrosine and/or phenylalanine, and at least 1.5% valine (each based on the total amount of amino acids of the collagen peptide). Preferably, the collagen peptide comprises 1.1 to 4.0% sulfur-containing amino acids, 0.8 to 4.0% histidine, 1.2 to 5.0% isoleucine, 2.7 to 16.0% leucine, 2.4 to 7.8% lysine, 1.4 to 5.8% threonine, 0.5 to 3.0% tryptophan, 2.6 to 7.7% tyrosine and/or phenylalanine, and 1.5 to 5.0% valine (in each case related to the total amount of amino acids in the collagen peptide).

In a preferred embodiment, the collagen peptide comprises at least 1.3% sulfur-containing amino acids, at least 1.0% histidine, at least 1.5% isoleucine, at least 3.4% leucine, at least 3.0% lysine, at least 1.8% threonine, at least 0.6% tryptophan, at least 3.3% tyrosine and/or phenylalanine, and at least 1.8% valine (in each case based on the total amount of amino acids in the collagen peptide). Preferably, the collagen peptide comprises 1.3 to 4.0% sulfur-containing amino acids, 1.0 to 4.0% histidine, 1.5 to 5.0% isoleucine, 3.4 to 16.0% leucine, 3.0 to 7.8% lysine, 1.8 to 5.8% threonine, 0.6 to 3.0% tryptophan, 3.3 to 7.7% tyrosine and/or phenylalanine, and 1.8 to 5.0% valine (in each case based on the total amount of amino acids in the collagen peptide).

In a further preferred embodiment of the present invention, the collagen peptide comprises at least 1.6% sulfur-containing amino acids, at least 1.2% histidine, at least 1.8% isoleucine, at least 4.1% leucine, at least 3.6% lysine, at least 2.1% threonine, at least 0.7% tryptophan, at least 3.9% tyrosine and/or phenylalanine, and at least 2.2% valine (in each case based on the total amount of amino acids in the collagen peptide). Preferably, the collagen peptide comprises 1.6 to 4.0% sulfur-containing amino acids, 1.2 to 4.0% histidine, 1.8 to 5.0% isoleucine, 4.1 to 16.0% leucine, 3.6 to 7.8% lysine, 2.1 to 5.8% threonine, 0.7 to 3.0% tryptophan, 3.9 to 7.7% tyrosine and/or phenylalanine, and 2.2 to 5.0% valine (in each case related to the total amount of amino acids in the collagen peptide).

Preferably, the collagen peptide comprises at least 1.8% sulfur-containing amino acids, at least 1.4% histidine, at least 2.0% isoleucine, at least 4.7% leucine, at least 4.2% lysine, at least 2.5% threonine, at least 0.8% tryptophan, at least 4.5% tyrosine and/or phenylalanine, and at least 2.5% valine (based on the total amount of amino acids in the collagen peptide). The collagen peptide particularly preferably comprises 1.8 to 4.0% sulfur-containing amino acids, 1.4 to 4.0% histidine, 2.0 to 5.0% isoleucine, 4.7 to 16.0% leucine, 4.2 bis 7.8% lysine, 2.5 to 5.8% threonine, 0.8 to 3.0% tryptophan, 4.5 to 7.7% tyrosine and/or phenylalanine, and 2.5 to 5.0% valine (in each case based on the total amount of amino acids in the collagen peptide).

According to a further preferred embodiment, the collagen peptide comprises at least 2.1% sulfur-containing amino acids, at least 1.6% histidine, at least 2.3% isoleucine, at least 5.4% leucine, at least 4.8% lysine, at least 2.8% threonine, at least 0.9% tryptophan, at least 5.1% tyrosine and/or phenylalanine, and at least 2.9% valine (based on the total amount of amino acids in the collagen peptide). Preferably, the collagen peptide comprises 2.1 to 4.0% sulfur-containing amino acids, 1.6 to 4.0% histidine, 2.3 to 5.0% isoleucine, 5.4 to 16.0% leucine, 4.8 to 7.8% lysine, 2.8 to 5.8% threonine, 0.9 to 3.0% tryptophan, 5.1 to 7.7% tyrosine and/or phenylalanine, and 2.9 to 5.0% valine (in each case related to the total amount of amino acids of the collagen peptide).

Particularly preferably, the collagen peptide comprises at least 2.3% sulfur-containing amino acids, at least 1.8% histidine, at least 2.6% isoleucine, at least 6.1% leucine, at least 5.4% lysine, at least 3.2% threonine, at least 1.1% tryptophan, at least 5.8% tyrosine and/or phenylalanine, and at least 3.3% valine (based on the total amount of amino acids in the collagen peptide). Preferably, the collagen peptide comprises 2.3 to 4.0% sulfur-containing amino acids, 1.8 to 4.0% histidine, 2.6 to 5.0% isoleucine, 6.1 to 16.0% leucine, 5.4 to 7.8% lysine, 3.2 to 5.8% threonine, 1.1 to 3.0% tryptophan, 5.8 to 7.7% tyrosine and/or phenylalanine, and 3.3 to 5.0% valine (in each case based on the total amount of amino acids in the collagen peptide).

In a further preferred embodiment of the present invention, the collagen peptide comprises at least 2.6% sulfur-containing amino acids, at least 2.0% histidine, at least 2.9% isoleucine, at least 6.7% leucine, at least 5.9% lysine, at least 3.5% threonine, at least 1.2% tryptophan, at least 6.5% tyrosine and/or phenylalanine, and at least 3.6% valine (in each case based on the total amount of amino acids in the collagen peptide). Preferably, the collagen peptide comprises 2.6 to 4.0% sulfur-containing amino acids, 2.0 to 4.0% histidine, 2.9 to 5.0% isoleucine, 6.7 to 16.0% leucine, 5.9 to 7.8% lysine, 3.5 to 5.8% threonine, 1.2 to 3.0% tryptophan, 6.5 to 7.7% tyrosine and/or phenylalanine, and 3.6 to 5.0% valine (in each case based on the total amount of amino acids of the collagen peptide).

In a further preferred embodiment of the present invention, the collagen peptide according to the invention is characterized by a particularly high content of the essential amino acid leucine, which is important for muscle building. According to this embodiment, the collagen peptide according to the invention comprises at least 8%, preferably at least 9%, preferably at least 10%, preferably at least 11%, particularly preferably at least 12% leucine (in each case based on the total amount of amino acids in the collagen peptide). In a preferred embodiment, the collagen peptide according to the invention comprises 6 to 20%, preferably 8 to 18%, particularly preferably 10 to 16% leucine (in each case based on the total amount of amino acids in the collagen peptide).

In a preferred embodiment of the present invention, the collagen peptide is non-hydroxylated.

The collagen peptide is preferably hydroxylated.

In a particularly preferred embodiment of the present invention, this relates to synthetic or recombinant collagen peptides according to the invention that are hydroxylated, in particular wherein some or all of the prolines present are hydroxylated, i.e. the prolines are partially or completely hydroxylated, i.e. are present as hydroxyproline, in particular 4-hydroxyproline. In a particularly preferred embodiment, the present invention also relates to collagen peptides in which the prolines present therein are partially or completely hydroxylated. In particular, the present invention also relates to proline-hydroxylated collagen peptides, comprising an amino acid sequence selected from the group consisting of SEQ ID NO: 2, 4, 7 to 10 and 19 to 22, the collagen peptide preferably consisting of one of the amino acid sequences mentioned.

The collagen peptides with the amino acid sequences according to SEQ ID NO: 19 to 22 are proline-hydroxylated variants of the collagen peptides according to the invention with the amino acid sequences SEQ ID NO: 5, 6, 11 and 12.

In another embodiment of the present invention, the collagen peptide is non-glycosylated.

The collagen peptide is preferably glycosylated.

The collagen peptide is preferably hydroxylated and glycosylated. In another preferred embodiment of the present invention, the collagen peptide is neither hydroxylated nor glycosylated.

In a preferred embodiment of the present invention, the collagen peptide according to the invention is a synthetically produced collagen peptide, preferably a collagen peptide produced by chemical synthesis, in particular solid phase synthesis, preferably Merrifield synthesis, Bailey peptide synthesis or chemoenzymatic synthesis.

In a further preferred embodiment of the present invention, the collagen peptide according to the invention is a recombinantly produced collagen peptide.

In one embodiment of the present invention, the collagen peptide according to the invention is a synthetically or recombinantly produced collagen peptide which was obtained by cleavage, in particular enzymatic cleavage, from a synthetically or recombinantly produced precursor peptide.

According to a further preferred embodiment of the present invention, the collagen peptide according to the invention is capable of stimulating the synthesis extracellular matrix proteins such as collagen, proteoglycan and/or elastin, in particular collagen and/or proteoglycan, in connective tissue cells, in particular in osteoblasts, chondrocytes and/or fibroblasts.

The collagen peptide according to the invention particularly preferably has a biological activity, preferably the same biological activity as collagen peptides of the same molecular weight obtained from natural sources and/or mixtures of collagen peptides obtained from natural sources with a comparable average molecular weight, particularly preferably a better biological activity than naturally sourced collagen peptides of the same molecular weight and/or mixtures of naturally sourced collagen peptides of comparable average molecular weight.

The present invention also relates to the collagen peptide according to the invention for non-therapeutic use in the human or animal body. The human or animal bodies treated non-therapeutically in connection with the present invention are preferably healthy human or animal bodies.

The present invention also relates to the collagen peptide according to the invention for use in a method for the therapeutic treatment of the human or animal body.

The present invention also relates to the collagen peptide according to the invention for use in a method for the preventive treatment of the human or animal body.

The present invention also relates in a preferred embodiment to the synthetic or recombinant collagen peptide according to the invention to be used in a method for preventing and/or treating bone diseases, in particular osteoporosis.

In a preferred embodiment the present invention relates to the synthetic or recombinant collagen peptide according to the invention to be used in a method for preventing and/or treating sarcopenia.

In a preferred embodiment the present invention relates to the synthetic or recombinant collagen peptide according to the invention to be used in a method for preventing and/or treating degenerative loss of muscle mass.

In a preferred embodiment the present invention relates to the synthetic or recombinant collagen peptide according to the invention to be used in a method for preventing and/or treating cartilage diseases, especially arthrosis or arthritis.

In a preferred embodiment the present invention relates to the synthetic or recombinant collagen peptide according to the invention to be used in a method for improving muscle strength.

In a preferred embodiment, the present invention relates to the synthetic or recombinant collagen peptide according to the invention, in particular a synthetic or recombinant collagen peptide according to the invention, comprising at least 10% leucine (% by weight based on the total weight of the collagen peptide), for use in a method for muscle building. In a further preferred embodiment, the present invention relates to the synthetic or recombinant collagen peptide according to the invention, in particular a synthetic or recombinant collagen peptide according to the invention, comprising at least 10% leucine (based on the total amount of amino acids of the collagen peptide), for use in a method for muscle building.

In a preferred embodiment the present invention relates to the synthetic or recombinant collagen peptide according to the invention, to be used in a method for preventing and/or treating a pathological condition based on reduced mitochondrial activity, in particular for preventing and/or treating a pathological condition characterized by reduced endurance.

In a preferred embodiment the present invention relates to the synthetic or recombinant collagen peptide according to the invention to be used in a method for stimulation of fat loss.

In a preferred embodiment the present invention relates to the synthetic or recombinant collagen peptide according to the invention to be used in a method for reduction of body weight.

In a preferred embodiment the present invention relates to the synthetic or recombinant collagen peptide according to the invention to be used in a method for preventing and/or treating degenerative joint diseases, in particular arthrosis, rheumatoid arthritis, rheumatic diseases, spondylitis and/or fibromyalgia.

In a preferred embodiment the present invention relates to the synthetic or recombinant collagen peptide according to the invention to be used in a method for preventing and/or treating diseases of the tendons or ligaments.

In a preferred embodiment the present invention relates to the synthetic or recombinant collagen peptide according to the invention to be used in a method for preventing and/or treating skin diseases, in particular psoriasis vulgaris, acne, atopic dermatitis, chronic pruritus and/or rosacea.

In a preferred embodiment the present invention relates to the synthetic or recombinant collagen peptide according to the invention to be used in a method for treating wounds, in particular chronic wounds, acute wounds and/or burns.

In a preferred embodiment the present invention relates to the synthetic or recombinant collagen peptide according to the invention to be used in a method for preventing and/or treating degenerative nerve diseases.

In a preferred embodiment the present invention relates to the synthetic or recombinant collagen peptide according to the invention to be used in a method for preventing and/or treating dementia.

In a preferred embodiment the present invention relates to the synthetic or recombinant collagen peptide according to the invention to be used in a method for preventing and/or treating Alzheimer's.

In a preferred embodiment, the present invention relates to the synthetic or recombinant collagen peptide according to the invention to be used in a method for preventing and/or treating a pathological condition characterized by a reduction in mental performance.

In a preferred embodiment the present invention relates to the synthetic or recombinant collagen peptide according to the invention to be used in a method for preventing and/or treating diseases associated with malfunctions of the blood-brain barrier, in particular the structure and/or function of the meninges.

In a preferred embodiment the present invention relates to the synthetic or recombinant collagen peptide according to the invention to be used in a method for preventing and/or treating intestinal diseases, especially chronic inflammatory intestinal diseases.

In a preferred embodiment the present invention relates to the synthetic or recombinant collagen peptide according to the invention to be used in a method for preventing and/or treating diseases of the cardiovascular system, in particular the structure or function of blood vessels, in particular the vessel wall, in particular for preventing and/or treating high blood pressure and/or circulatory disorders.

In a preferred embodiment the present invention relates to the synthetic or recombinant collagen peptide according to the invention to be used in a method for preventing and/or treating diseases of the periodontium.

In a preferred embodiment, the present invention also relates to the non-therapeutic use of the collagen peptide according to the invention for the visual and structural improvement of the skin, in particular for reducing wrinkles, improving skin elasticity, increasing skin resilience, increasing the moisture content of the skin, reducing cellulite and/or reducing stretch marks, especially stretch marks from pregnancy.

In a further preferred embodiment, the present invention relates to the non-therapeutic use of the collagen peptide according to the invention for accelerating the growth of nails and/or reducing the fragility of nails.

In a preferred embodiment, the present invention also relates to the non-therapeutic use of the collagen peptide according to the invention for the visual and structural improvement of the hair, in particular for improving hair quality, reducing split ends and/or reducing/delaying hair loss.

In a further preferred embodiment, the present invention relates to the non-therapeutic use of the collagen peptide according to the invention for increasing the number of mitochondria and/or mitochondrial activity.

In a further preferred embodiment, the present invention relates to the non-therapeutic use of the collagen peptide according to the invention for improving endurance performance.

In a further preferred embodiment, the present invention relates to the non-therapeutic use of the collagen peptide according to the invention for improving mental performance.

In a preferred embodiment, the present invention relates to the non-therapeutic use of the collagen peptide according to the invention, in particular a collagen peptide according to the invention, comprising at least 8%, preferably at least 9%, preferably at least 10%, preferably at least 11%, preferably at least 12% leucine (in each case % by weight based on the total weight of the collagen peptide), for muscle building. In a further preferred embodiment, the present invention relates to the non-therapeutic use of the collagen peptide according to the invention, in particular a collagen peptide according to the invention, comprising at least 8%, preferably at least 9%, preferably at least 10%, preferably at least 11%, preferably at least 12% leucine (based on the total amount of amino acids of the collagen peptide), for muscle building.

In a preferred embodiment of the present invention, the synthetic or recombinant collagen peptide according to the invention is used alone, i.e., without further substances, for use in one of the applications provided according to the invention.

In a further embodiment of the present invention, the synthetic or recombinant collagen peptide according to the invention is used as the sole agent exhibiting biological activity in an application provided according to the invention.

The present invention also relates to methods for preventing and/or treating the aforementioned indications, in particular of the aforementioned therapeutic indications, according to which the human or animal body is administered a sufficient amount of the synthetic or recombinant collagen peptide according to the invention for the therapeutic purpose, optionally with an additive.

The present invention also relates to a non-therapeutic method for improving muscle strength, for increasing muscle mass, for stimulating fat loss, for reducing body weight, for maintaining and/or improving bone health, for maintaining and/or improving skin health, for maintaining and/or improving the intestinal health, for maintaining and/or improving the blood vessel structure, for maintaining and/or improving the health of the cardiovascular system, for maintaining and/or improving the gums, for maintaining and/or improving the health of the nails and hair of a human or animal body, for maintaining and/or increasing the number of mitochondria and/or mitochondrial activity, for maintaining and/or improving endurance performance or for maintaining and/or improving mental performance, wherein at least one collagen peptide according to the invention is administered to the human or animal body.

In a further preferred embodiment, the collagen peptide according to the invention is used together with at least one further agent, in particular a further biologically active agent, in an application provided according to the invention.

The present invention also relates to a pharmaceutical composition comprising at least one collagen peptide according to the invention and at least one pharmaceutically acceptable additive, as well as the pharmaceutical composition for use in a method for the therapeutic treatment of the human or animal body, in particular for use in at least one of the aforementioned indications. Accordingly, it can be provided that the collagen peptide according to the invention is administered in the form of a pharmaceutical preparation. The pharmaceutical preparation according to the invention is administered particularly advantageously, for example, in the form of tablets, lozenges, chewable tablets, capsules, bite capsules, coated tablets, pastilles, juices, gels or ointments.

The present invention also relates to a food supplement comprising at least one collagen peptide according to the invention and at least one food-acceptable additive, as well as the food supplement for use in a method for the therapeutic treatment of the human or animal body, in particular for use in at least one of the aforementioned indications. Accordingly, it can be provided that the collagen peptide according to the invention is administered in the form of a food supplement. The food supplement according to the invention is particularly advantageously in the form of a tablet, coated tablet, pastille, solution, suspension or gel, for example, in an ampoule, as granules or powder. Due to its good solubility, the collagen peptide according to the invention may also be added to various beverages without causing cloudiness.

The present invention also relates to a cosmetic product comprising at least one collagen peptide according to the invention and at least one skin-compatible additive, as well as the cosmetic product for use in a method for the therapeutic treatment of the human or animal body, in particular for use in at least one of the aforementioned indications. Accordingly, it can be provided that the collagen peptide according to the invention is administered in the form of a cosmetic composition. The cosmetic composition according to the invention is particularly advantageously administered, for example, in the form of lotions, ointments, creams, gels, powders, syringes or sprays.

The invention also relates to a food or luxury food item comprising a collagen peptide according to the invention, as well as the food or luxury food item for use in a method for the therapeutic treatment of the human or animal body, in particular for use in at least one of the aforementioned indications. According to a preferred embodiment, the food or luxury food item is a chocolate bar, protein bar, cereal bar, instant powder for the preparation of beverages, milk, milk products, for example yogurt, whey or quark and milk substitutes, for example soy milk, rice milk, almond milk, and coconut milk (so-called functional food) or a drink, e.g. soft drink or fitness drink.

If the collagen peptide according to one preferred embodiment of the invention is not used as the sole physiologically active component of a product, in particular of a pharmaceutical preparation, of a food supplement, of a cosmetic preparation or of a food or luxury food item, it may be combined with one or more other components that have a positive effect on general health, in particular on endurance performance. Such components are preferably selected from the group consisting of vitamin C, vitamins of the B, D, E and K series, omega-3 fatty acids, omega-6 fatty acids, conjugated linolenic acids, caffeine and its derivatives, guarana extract, rose hip extract, green tea extract, epigallocatechin gallate, creatine, L-carnitine, α-lipoic acid, N-acetylcysteine, NADH, D-ribose, magnesium aspartate, antioxidants such as anthocyanins, carotenoids, flavonoids, resveratrol, glutathione and superoxide dismutase (SOD), cannabidinoids such as cannabidiol (CBD), adaptogens such as *Rhodiola rosea, Panax ginseng, Withania somnifera, shiitake, Ganoderma luciduml Lepidium meyenii*, and minerals such as iron, magnesium, calcium, zinc, selenium and phosphorus, as well as other proteins, hydrolysates and peptides such as soy, wheat, and whey protein.

In a further preferred embodiment of the present invention, the products according to the invention, in particular the pharmaceutical preparation, the dietary supplement, the food or food luxury item, the cosmetic product, contain no further proteins or peptides in addition to the collagen peptide according to the invention, in particular no further collagen peptides.

In one preferred embodiment of the invention, the collagen peptide is administered in an amount of 1 to 40 g per day, preferably from 1 to 30 g per day, preferably from 1 to 20 g per day, preferably from 1 to 15 g per day, preferably from 2.5 to 30 g per day, preferably 2.5 to 20 g per day, preferably 2.5 to 15 g per day, preferably 2.5 to 10 g per day, preferably 4 to 15 g per day, preferably 4 to 12 g per day, more preferably from 5 to 25 g per day, preferably from 5 to 15 g per day, preferably from 10 to 25 g per day, preferably from 12 to 22 g per day, preferably 6 to 15 g per day, in particular from 2.5 to 7.5 g per day, preferably 2.5 to 5 g per day.

According to the invention, the term "biological activity" preferably denotes the ability of the collagen peptides according to the invention to stimulate the synthesis of extracellular matrix proteins, in particular the synthesis of collagen, proteoglycans and/or elastin, in cells, in particular osteoblasts, fibroblasts and/or chondrocytes. According to the invention, a "biological activity" is preferably present when through the incubation of cells, in particular osteoblasts, fibroblasts and/or chondrocytes, with the collagen peptides according to the invention, the synthesis of extracellular matrix proteins is stimulated, in particular the synthesis of collagen, proteoglycans and/or elastin, preferably measurable in at least one, preferably at least two, preferably in all of the in vitro tests shown in Examples 7 to 10, and for stimulating the synthesis of extracellular matrix proteins is stimulated in osteoblasts, fibroblasts and chondrocytes, compared to untreated cells and/or cells treated with a biologically inactive agent, in particular untreated osteoblasts, fibroblasts and/or chondrocytes, or osteoblasts, fibroblasts and/or chondrocytes treated with a biologically inactive agent. In a preferred embodiment of the present invention, a "biologically inactive agent" is understood to mean 160 Bloom gelatin from pig skin or a 260 Bloom gelatin from bovine split.

According to the invention, "equal biological activity" is preferably understood to mean that the collagen peptides according to the invention stimulate the synthesis of extracellular matrix proteins, in particular the synthesis of collagen, proteoglycans and/or elastin, in cells, in particular osteoblasts, fibroblasts and/or chondrocytes, which is comparable to the stimulation of cells, in particular osteoblasts, fibroblasts and/or chondrocytes, which, when incubated with a mixture of collagen peptides obtained from natural sources, can be measured in particular when incubated with a mixture of collagen peptides obtained from natural sources with a comparable average molecular weight, in particular with Verisol, produced according to EP 2640352 B1, Fortigel, produced according to WO 2010/149596 or Fortibone, produced according to WO 2014/072235 (EP 2916855 B1). According to the invention, a "comparable stimulation" preferably denotes a stimulation of the synthesis of extracellular matrix proteins, in particular the synthesis of collagen, proteoglycans and/or elastin, in cells, in particular osteoblasts, fibroblasts and/or chondrocytes, preferably measurable in at least one, preferably at least two, preferably in all of the in vitro tests shown in Examples 7 to 10 for stimulating the synthesis of extracellular matrix proteins in osteoblasts, fibroblasts and chondrocytes, which deviate by at most 2%, preferably at most 1.5%, preferably at most 1% from the stimulation of the synthesis of extracellular matrix proteins, in particular the synthesis of collagen, proteoglycans and/or elastin, in cells, in particular osteoblasts, fibroblasts and/or chondrocytes, which are produced by incubating the cells with a mixture of collagen peptides obtained from natural sources, in particular by incubating the cells with a mixture of collagen peptides obtained from natural sources with a comparable average molecular weight, in particular with Verisol, produced according to EP 2640352 B1, Fortigel, produced according to WO 2010/149596 or Fortibone, produced according to WO 2014/072235 (EP 2916855 B1).

According to the invention, the term "better biological activity" is preferably understood to mean that the collagen peptides according to the invention cause a stronger stimulation of the synthesis of extracellular matrix proteins, in particular the synthesis of collagen, proteoglycans and/or elastin, in cells, in particular osteoblasts, fibroblasts and/or chondrocytes, than a mixture of collagen peptides obtained from natural sources, in particular a mixture of collagen peptides obtained from natural sources with a comparable average molecular weight, in particular with Verisol, produced according to EP 2640352 B1, Fortigel, produced according to WO 2010/149596, or Fortibone, produced according to WO 2014/072235 (EP 2916855 B1). According to the invention, "better biological effectiveness" means an increase in the stimulation of the synthesis of extracellular matrix proteins, in particular the synthesis of collagen, proteoglycans and/or elastin, in cells, in particular osteoblasts, fibroblasts and/or chondrocytes, by the collagen peptides according to the invention by more than 2%, preferably at least 3%, preferably at least 4%, preferably at least 5%, compared to the stimulation of the synthesis of extracellular matrix proteins, in particular the synthesis of collagen, proteoglycans and/or elastin, in cells, in particular osteoblasts, fibroblasts and/or chondrocytes, by a mixture of collagen peptides obtained from natural sources, in particular with Verisol, produced according to EP 2640352 B1, Fortigel, produced according to WO 2010/149596 or Fortibone, produced according to WO 2014/072235 (EP 2916855 B1), wherein the increase in synthesis can be measured in at least one, preferably in at least two, preferably in all, of the in vitro tests shown in Examples 7 to 10 for stimulating the synthesis of extracellular matrix proteins in osteoblasts, fibroblasts and chondrocytes.

According to the invention, a "biological activity," an "equal biological activity" or a "better biological activity" can accordingly be present if the collagen peptides according to the invention are capable of stimulating the synthesis of an extracellular matrix protein, preferably if at least the synthesis of one of the extracellular matrix proteins collagen, proteoglycan or elastin, preferably by two or three of these extracellular matrix proteins, is stimulated in cells, preferably in at least one of the cell types osteoblasts, fibroblasts or chondrocytes, preferably in two or three of these cell types. Accordingly, biological activity can also be present in one embodiment of the present invention if only the synthesis of an extracellular matrix protein is stimulated, in particular, for example, an extracellular matrix protein selected from the group consisting of collagen, proteoglycan and elastin, while for other extracellular matrix proteins there is no stimulation of the synthesis detected in the cells concerned. Biological activity, or the same or better biological activity, can also be present if stimulation of the synthesis of at least one extracellular matrix protein is found in only one cell type, in particular one cell type selected from the group consisting of osteoblasts, fibroblasts and chondrocytes, even if in other cell types such stimulation does not occur. It is preferably provided that the synthesis of more than one extracellular matrix protein, in particular of one or more of the explicitly mentioned extracellular matrix proteins selected from the group consisting of collagen, proteoglycan and elastin, is stimulated in cells, in particular in at least one of the cell types osteoblasts, fibroblasts or chondrocytes, particularly in two or three of these cell types.

According to the present invention, a "biological activity," "equal biological activity" or "better biological activity" of the collagen peptides according to the invention in osteoblasts after incubation of the cells with the collagen peptides according to the invention can be determined in particular by determining the expression of the mRNA of the corresponding extracellular matrix proteins, in particular selected from the group consisting of collagen, proteoglycan and elastin, in comparison to the expression of the mRNA of the corresponding extracellular matrix proteins, in particular selected from the group consisting of collagen, proteoglycan and elastin, in suitable controls by means of real-time PCR, in particular by the in vitro test listed in Example 7.

According to the present invention, a "biological activity," "equal biological activity" or "better biological activity" of the collagen peptides according to the invention in fibroblasts can, according to the present invention, be detected after incubation of the cells with the collagen peptides according to the invention by determining the expression of the mRNA of the corresponding extracellular matrix proteins, in particular selected from the group consisting of collagen, biglycan and versican, in comparison to the expression of the mRNA of the corresponding extracellular matrix proteins, in particular selected from the group consisting of collagen, biglycan and versican, in suitable controls using real-time PCR, in particular by the in vitro test listed in Example 8.

According to the present invention, a "biological effectiveness," "equal biological effectiveness" or "better biological effectiveness" of the collagen peptides according to the invention in chondrocytes can be determined after incubation of the cells with the collagen peptides according to the invention by radioactive labeling and detection of the amount of synthesized radioactively labeled collagen and/or by Alcian blue staining and photometric determination of the glycosaminoglycans (GAG) of synthesized proteoglycans in each case in comparison with suitable controls, in particular by the in vitro tests listed in Example 9.

A "biological effectiveness," an "equal biological effectiveness" or a "better biological effectiveness" of the collagen peptides according to the invention in osteoblasts, fibroblasts and chondrocytes, in particular in fibroblasts and chondrocytes, can be determined according to the present invention after incubation of the cells with the collagen peptides according to the invention through determination of the amount of synthesized extracellular matrix proteins, in particular selected from the group consisting of collagen, proteoglycan and elastin, particularly preferably selected from the group consisting of collagen and proteoglycan, in comparison to the determination of the amount of synthesized extracellular matrix proteins, in particular selected from the group consisting of collagen, proteoglycan and elastin, particularly preferably selected from the group consisting of collagen and proteoglycan, in suitable controls by means of photometric determination of the amount of synthesized extracellular matrix proteins labeled with dye, in particular selected from the group consisting of collagen, proteoglycan and elastin, particularly preferably selected from the group consisting of collagen and proteoglycan, in particular by the in vitro tests listed in Example 10.

According to the invention, the term "biological effectiveness in at least one, preferably in at least two, preferably in all, of the in vitro tests shown in Examples 7 to 10 for stimulating the synthesis of extracellular matrix proteins in osteoblasts, fibroblasts and chondrocytes" means that the biological activity of the collagen peptides according to the invention can be shown with one of the assays explicitly carried out in Examples 7 to 10. The individual method parameters listed in Examples 7 to 10 can optionally be varied in accordance with expert understanding without influencing the fundamental significance of the test results. In a preferred embodiment of the present invention, the collagen peptides according to the invention show a biological activity in at least one, preferably in at least two, preferably in all of the in vitro tests shown in Examples 7 to 10 for stimulating the synthesis of extracellular matrix proteins in osteoblasts, fibroblasts, and chondrocytes under exactly the method parameters listed in these examples. Furthermore, the biological effectiveness of the collagen peptides according to the invention can also be demonstrated with further tests known to the person skilled in the art, in particular in vitro tests, preferably in vitro tests for stimulating the synthesis of extracellular matrix proteins in osteoblasts, fibroblasts and chondrocytes.

The term "stimulation of the synthesis of extracellular matrix proteins" according to the invention means to stimulate the biosynthesis of at least one protein of the extracellular matrix in cells, preferably in osteoblasts, fibroblasts and/or chondrocytes, and/or stimulate the biosynthesis of at least one mRNA encoding protein of the extracellular matrix in cells, preferably in osteoblasts, fibroblasts and/or chondrocytes, understood through exogenous influences, in particular through the collagen peptides according to the invention. In particular, the term "stimulation of the synthesis of extracellular matrix proteins" according to the invention means an increase in the amount of at least one protein of the extracellular matrix secreted by cells, preferably osteoblasts, fibroblasts and/or chondrocytes, and/or an increase in the synthesized amount in cells, preferably in osteoblasts, fibroblasts and/or chondrocytes, of at least one mRNA encoding a protein of the extracellular matrix by exogenous influences, in particular by the collagen peptides according to the invention.

The term "collagen" in connection with the present invention is understood in a manner customary in the art, in particular as defined, for example, in WO 01/34646. In a preferred embodiment, the term "collagen" relates to collagen types I to XXVII. In a further preferred embodiment, the term "collagen" is understood to mean a peptide that has the sequence glycine-proline, glycine-4-hydroxyproline or glycine-X-4-hydroxyproline, preferably the repetitive motif $(Gly-X-Y)_n$, wherein X and Y may be any amino acid, preferably proline and 4-hydroxyproline. The term "collagen" is particularly preferably understood to mean a peptide having the repetitive motif $(Gly-Pro-Y)_n$ and/or $(Gly-X-Hyp)_m$, where X and Y may be any amino acid.

In connection with the present invention, the term "gelatin" is preferably understood in a manner customary in the art, in particular as defined, for example, in WO 01/34646.

In connection with the present invention, the term "collagen peptide" is understood to mean a peptide which has an amino acid sequence occurring in collagen as defined above, the peptide being at least one dipeptide, preferably an oligopeptide or a polypeptide. The collagen peptide can in particular be present in chemically modified form, in particular hydroxylated and/or glycosylated form, or it can be unmodified.

According to the invention, an "essential amino acid" is understood to mean the amino acids isoleucine, leucine, lysine, methionine, phenylalanine, threonine, tryptophan, valine, histidine, cysteine and tyrosine.

The term "Protein Digestibility Corrected Amino Acid Score (PDCAAS)" is a value used to determine the physiological quality of proteins, which is derived from the content and amount of amino acids essential for humans in proteins on the one hand and from the digestibility the proteins on the other hand. The PDCAAS can have values between 0 and 1, wherein a value of 1 means that after digestion the protein provides all the amino acids essential for humans in the required amounts. The PDCAAS is calculated according to the invention from the amount of each individual essential amino acid in one g of the relevant protein in relation to the amount of the recommended amount of the relevant essential amino acid in one g of a reference protein, wherein the quotient obtained is multiplied by the fecal digestibility of the relevant protein:

PDCAAS=[mg of an essential amino acid per g of test protein/recommended amount of the same essential amino acid per g of protein]*fecal digestibility of the test protein If the calculation of the PDCAAS results in a value of 1 or more for all essential amino acids, the protein in question has a PDCAAS of 1. If the protein in question is missing one or more amino acids essential for humans, the PDCAAS has a value of 0 by definition. The lowest determined value of the individual amino acids is decisive for the PDCAAS of the total protein. The recommended amounts of amino acids essential for humans used according to the invention to calculate the PDCAAS were based on the recommendations of the Dietary Reference Intakes for Energy, Carbohydrate, Fiber, Fat, Fatty Acids, Cholesterol, Protein, and Amino Acids (2005) and the joint report of by the FAO/WHO for the evaluation of protein quality (1991).

TABLE 1

Requirements of 1- to 3-year-old children for essential amino acids according to DRI (2005)

| amino acid | mg/g protein |
|---|---|
| isoleucine | 25 |
| leucine | 55 |
| lysine | 51 |
| methionine + cysteine (SAA) | 25 |
| phenylalanine + tyrosine | 47 |
| threonine | 27 |
| tryptophan | 7 |
| valine | 32 |
| histidine | 18 |

TABLE 2

Requirement of 2- to 5-year-old children for essential amino acids according to FAO/WHO (1991)

| amino acid | mg/g protein |
|---|---|
| isoleucine | 28 |
| leucine | 66 |
| lysine | 58 |
| methionine + cysteine (SAA) | 25 |

TABLE 2-continued

Requirement of 2- to 5-year-old children for essential amino acids according to FAO/WHO (1991)

| amino acid | mg/g protein |
|---|---|
| phenylalanine + tyrosine | 63 |
| threonine | 34 |
| tryptophan | 11 |
| valine | 35 |
| histidine | 19 |

In connection with the present invention, a "synthetic or recombinant collagen peptide" or a "synthetically or recombinantly produced collagen peptide" is understood to mean a collagen peptide obtained by chemical synthesis, in particular solid phase synthesis, or by biotechnological recombinant production using an expression system. According to the invention, the "synthetic collagen peptide" or the "synthetically produced collagen peptide" and the "recombinant collagen peptide" or the "recombinantly produced collagen peptide" have in common that they are not obtained from natural sources.

In connection with the present invention, the terms "comprising" and "including" are understood to mean that in addition to the elements explicitly covered by these terms, further elements that are not explicitly mentioned may be added. In connection with the present invention, these terms are also understood to mean that only the explicitly mentioned elements are included and no further elements are present. In this particular embodiment, the meaning of the terms "comprising" and "including" is synonymous with the term "consisting of." In addition, the terms "comprising" and "including" also include compositions which, in addition to the explicitly named elements, also contain other elements not mentioned, but which are functionally and qualitatively subordinate. In this embodiment, the terms "comprising" and "including" are synonymous with the term "consisting essentially of."

In connection with the present invention, the term "and/or" is understood to mean that all members of a group which are connected by the term "and/or" are disclosed both as alternatives to one another and also cumulatively to one another in any combination. For the expression "A, B and/or C," this means that the following disclosure content is to be understood to mean: a) A or B or C or b) (A and B) or c) (A and C) or d) (B and C) or e) (A and B and C).

If, in connection with the present invention, the first and second decimal places or the second decimal place are/is not specified, these are/is to be set to 0.

Further preferred embodiments result from the dependent claims.

The invention is described below without restricting the general inventive concept on the basis of exemplary sequences, figures, and embodiments.

In the following:

FIG. 1A shows the stimulation of the collagen synthesis of human dermal fibroblasts by the collagen peptides according to the invention of SEQ ID NO: 7, SEQ ID NO: 8, SEQ ID NO: 9 and SEQ ID NO: 10 in comparison to a mixture of collagen peptides obtained from natural sources with a comparable average molecular weight (Verisol) according to Example 10. The FIGURE shows the factor for the quantitative determination of collagen synthesis compared to an untreated sample. The error bars show the standard error (SEM).

Figure 1B:
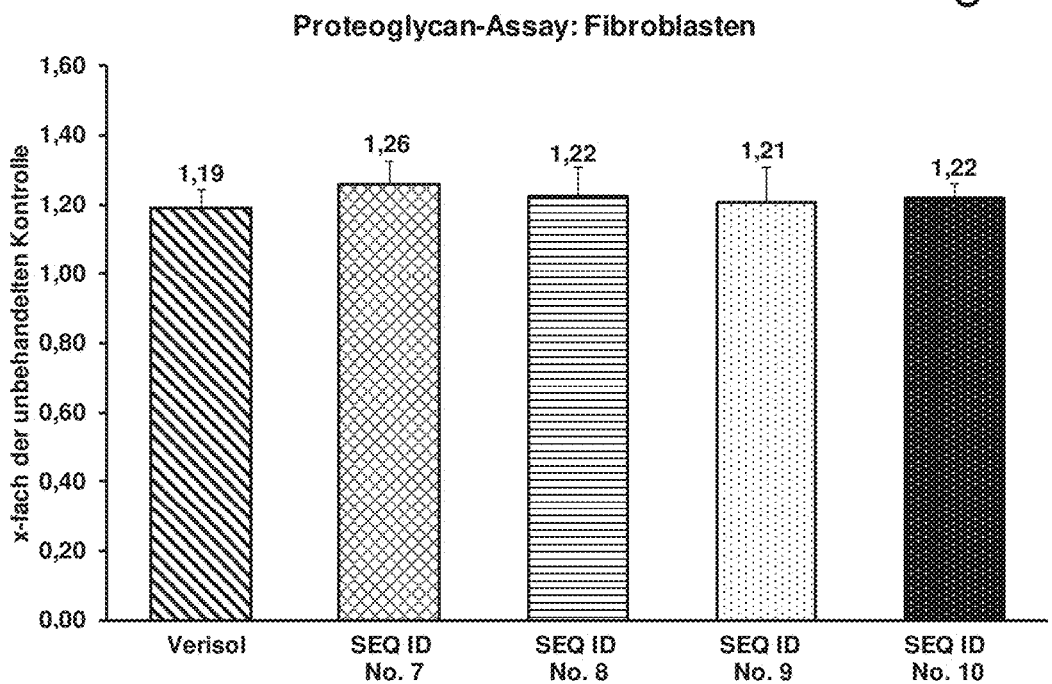

FIG. 1B shows the stimulation of the synthesis of proteoglycans of human dermal fibroblasts by the collagen peptides according to the invention of SEQ ID NO: 7, SEQ ID NO: 8, SEQ ID NO: 9 and SEQ ID NO: 10 in comparison to a mixture of collagen peptides obtained from natural sources with a comparable average molecular weight (Verisol) according to Example 10. The FIGURE shows the factor for the quantitative determination of collagen synthesis compared to an untreated sample. The error bars show the standard error (SEM).

EXAMPLES

Example 1—Solid Phase Synthesis

Collagen peptides according to the invention of the SEQ ID NO: 5 to 12 were obtained by solid phase synthesis (Merrifield synthesis) on a polystyrene resin.

Example 2—Recombinant Production

Collagen peptides according to the invention were also obtained by recombinant expression in *Pichia pastoris*.

Example 3—Level of Essential Amino Acids

For the synthetically or recombinantly produced hydroxylated and non-hydroxylated collagen peptides of SEQ ID NO: 5 to 12 from example 1 and SEQ ID NO: 19 to 22 (hydroxyproline-containing forms of SEQ ID NO: 5, 6, 11 and 12) the percentage (% by weight) of essential amino acids was calculated. The results are shown in Table 3.

TABLE 3

Synthetically or recombinantly produced collagen peptides according to the invention

| SEQ ID No. | Amino acid sequence | | Percentage of essential amino acids (% by weight based on the total weight of the collagen peptide) |
|---|---|---|---|
| 5 | GVPGYTGIKGFLGIPGYPGTQGLPGLNG MPGWHGLFGLPGPKGMTGKVGPKGIF GAPGKDGVRGLTGPIGPPGPAGAPGDK GEAGPSGPFGPTGLCGVPGWHGYPGH K | CYS + MET | 3.6 |
| | | HIS | 4.0 |
| | | ILE | 4.4 |
| | | LEU | 7.9 |
| | | LYS | 8.7 |
| | | THR | 5.0 |
| | | TRP | 3.7 |
| | | TYR + PHE | 10.5 |
| | | VAL | 3.8 |

TABLE 3-continued

Synthetically or recombinantly produced collagen peptides according to the invention

| SEQ ID No. | Amino acid sequence | Percentage of essential amino acids (% by weight based on the total weight of the collagen peptide) | |
|---|---|---|---|
| 6 | GLTGFMGILGYVGPKGPTGNHGCPGPH GPIGKFGSKGPLGWTGPIGKPGEVGPM GPTGPLGWKGAPGADGPAGAPGTPGP QGILGYRGVVGLPGFKGYHGFPGLK | CYS + MET | 3.7 |
| | | HIS | 4.1 |
| | | ILE | 4.5 |
| | | LEU | 7.9 |
| | | LYS | 8.9 |
| | | THR | 5.1 |
| | | TRP | 3.7 |
| | | TYR + PHE | 10.7 |
| | | VAL | 3.9 |
| 7 | GL[P]GKMGVFGLTGPIGP[P]GPWGV[P] GHKGYLGPT | CYS + MET | 4.1 |
| | | HIS | 4.3 |
| | | ILE | 3.5 |
| | | LEU | 10.7 |
| | | LYS | 8.1 |
| | | THR | 6.4 |
| | | TRP | 5.8 |
| | | TYR + PHE | 9.7 |
| | | VAL | 6.3 |
| 8 | GL[P]GKYGVHGLTGPLGP[P]GPMGI[P] GWKGFVGPT | CYS + MET | 4.1 |
| | | HIS | 4.3 |
| | | ILE | 3.5 |
| | | LEU | 10.7 |
| | | LYS | 8.1 |
| | | THR | 6.4 |
| | | TRP | 5.8 |
| | | TYR + PHE | 9.7 |
| | | VAL | 6.3 |
| 9 | GP[P]GPLGMKGL[P]GVWGPFGL[P]GTP GPHGITGYKGV | CYS + MET | 3.8 |
| | | HIS | 4.0 |
| | | ILE | 3.3 |
| | | LEU | 9.9 |
| | | LYS | 7.3 |
| | | THR | 6.0 |
| | | TRP | 5.2 |
| | | TYR + PHE | 8.8 |
| | | VAL | 5.9 |
| 10 | GP[P]GPVGTKGL[P]GFYGPLGI[P]GHPG PWGMLGTKGV | CYS + MET | 3.8 |
| | | HIS | 4.0 |
| | | ILE | 3.3 |
| | | LEU | 9.9 |
| | | LYS | 7.3 |
| | | THR | 6.0 |
| | | TRP | 5.2 |
| | | TYR + PHE | 8.8 |
| | | VAL | 5.9 |
| 11 | GMTGKVGPKGIFGAPGKDGVRGLTGPI GPPGPAGAPGDKGEAGPSGPFGPTGL CGVPGWHGYP | CYS + MET | 4.0 |
| | | HIS | 2.4 |
| | | ILE | 3.9 |
| | | LEU | 3.9 |
| | | LYS | 9.0 |
| | | THR | 5.2 |
| | | TRP | 3.2 |
| | | TYR + PHE | 7.9 |
| | | VAL | 5.1 |
| 12 | GLTGFMGILGYVGPKGPTGNHGCPGPH GPIGKFGSKGPLGWTGPIGKPGEVGPM GPTGPLGWKGAPGADGPAGAPGTPGP QGILGY | CYS + MET | 4.5 |
| | | HIS | 3.4 |
| | | ILE | 5.7 |
| | | LEU | 7.0 |
| | | LYS | 7.9 |
| | | THR | 6.3 |
| | | TRP | 4.6 |
| | | TYR + PHE | 7.6 |
| | | VAL | 2.4 |

TABLE 3-continued

Synthetically or recombinantly produced collagen peptides according to the invention

| SEQ ID No. | Amino acid sequence | Percentage of essential amino acids (% by weight based on the total weight of the collagen peptide) | |
|---|---|---|---|
| 19 | GV[P]GYTGIKGFLGI[P]GY[P]GTQGL[P]GLNGM[P]GWHGLFGLPGPKGMTGKVGPKGIFGA[P]GKDGVRGLTGPIGP[P]GPAGA[P]GDKGEAGPSG[P]FGPTGLCGV[P]GWHGY[P]GHK | CYS + MET | 3.6 |
| | | HIS | 4.0 |
| | | ILE | 4.4 |
| | | LEU | 7.9 |
| | | LYS | 8.7 |
| | | THR | 5.0 |
| | | TRP | 3.7 |
| | | TYR + PHE | 10.5 |
| | | VAL | 3.8 |
| 20 | GLTGFMGILGYVGPKGPTGNHGC[P]GPHGPIGKFGSKGPLGWTGPIGK[P]GEVGPMGPTGPLGWKGA[P]GADGPAGA[P]GTPGPQGILGYRGVVGL[P]GFKGYHGF[P]GLK | CYS + MET | 3.7 |
| | | HIS | 4.1 |
| | | ILE | 4.5 |
| | | LEU | 7.9 |
| | | LYS | 8.9 |
| | | THR | 5.1 |
| | | TRP | 3.7 |
| | | TYR + PHE | 10.7 |
| | | VAL | 3.9 |
| 21 | GMTGKVGPKGIFGA[P]GKDGVRGLTGPIGP[P]GPAGA[P]GDKGEAGPSG[P]FGPTGLCGV[P]GWHGY[P] | CYS + MET | 4.0 |
| | | HIS | 2.4 |
| | | ILE | 3.9 |
| | | LEU | 3.9 |
| | | LYS | 9.0 |
| | | THR | 5.2 |
| | | TRP | 3.2 |
| | | TYR + PHE | 7.9 |
| | | VAL | 5.1 |
| 22 | GLTGFMGILGYVGPKGPTGNHGC[P]GPHGPIGKFGSKGPLGWTGPIGK[P]GEVGPMGPTGPLGWKGA[P]GADGPAGA[P]GTPGPQGILGY | CYS + MET | 4.5 |
| | | HIS | 3.4 |
| | | ILE | 5.7 |
| | | LEU | 7.0 |
| | | LYS | 7.9 |
| | | THR | 6.3 |
| | | TRP | 4.6 |
| | | TYR + PHE | 7.6 |
| | | VAL | 2.4 |

[P] denotes 4-hydroxyproline; essential amino acids are shown in bold.

Example 4—Nutritional Optimization of Bovine α1 Chain of Collagen Type I

Starting from the natural amino acid sequence of the α1 chain of bovine collagen type I, a conservative amino acid exchange of non-essential amino acids was carried out to provide a nutritionally optimized collagen peptide, i.e. non-essential hydrophobic amino acids were preferably exchanged for hydrophobic essential amino acids. The exchange for polar, aliphatic and aromatic amino acids was carried out in the same way. Care was also taken to ensure that the amino acid motif (Gly-X-Y) remains intact and that the prolines or 4-hydroxyprolines located at the variable positions X and Y in the natural sequence are not exchanged. For the approx. 90 kDa collagen peptide according to the invention obtained in this way, comprising 1014 amino acids (SEQ ID NO: 13) and the two halves each comprising 507 amino acids (SEQ ID NO: 14 and 15), the percentage of essential amino acids (% by weight based on the total weight of the collagen peptide) were calculated (see Table 4)

TABLE 4

Nutritionally optimized collagen peptides derived from bovine Type I collagen

| SEQ ID No. | | Percentage of essential amino acids (% by weight based on the total weight of the collagen peptide) |
|---|---|---|
| 13 | CYS + MET | 4.2 |
| | HIS | 3.5 |
| | ILE | 4.6 |
| | LEU | 8.6 |
| | LYS | 8.3 |
| | THR | 4.7 |
| | TRP | 3.6 |
| | TYR + PHE | 11.2 |
| | VAL | 4.0 |
| 14 | CYS + MET | 4.6 |
| | HIS | 3.9 |
| | ILE | 5.2 |
| | LEU | 9.3 |
| | LYS | 8.2 |
| | THR | 4.6 |
| | TRP | 3.0 |
| | TYR + PHE | 10.9 |
| | VAL | 3.9 |

TABLE 4-continued

Nutritionally optimized collagen peptides
derived from bovine Type I collagen

| SEQ ID No. | Percentage of essential amino acids (% by weight based on the total weight of the collagen peptide) | |
|---|---|---|
| 15 | CYS + MET | 3.6 |
|  | HIS | 3.6 |
|  | ILE | 4.2 |
|  | LEU | 7.7 |
|  | LYS | 8.2 |
|  | THR | 4.6 |
|  | TRP | 3.8 |
|  | TYR + PHE | 11.3 |
|  | VAL | 3.9 |

Example 5—Nutritionally Optimized Collagen Peptide with Increased Leucine Content The essential amino acid leucine is of particular importance for muscle building. For the greatest possible effect of the amino acid on muscle-building, a quantity of at least 100 mg per g of total protein is recommended. To provide a nutritionally optimized collagen peptide with an increased leucine content, starting from a nutritionally optimized collagen peptide derived from the α1 chain of bovine type I collagen according to SEQ ID NO: 13, a further amino acid exchange was carried out in order to achieve a leucine content of at least 100 mg/g total protein (SEQ ID NO: 16). SEQ ID NO: 17 and 18 are the two 507 amino acid halves of the collagen peptide according to SEQ ID NO: 16.

TABLE 5

Collagen peptides according to the invention
with an increased leucine content

| SEQ ID No. | Percentage of essential amino acids (% by weight based on the total weight of the collagen peptide) | |
|---|---|---|
| 16 | CYS + MET | 4.2 |
|  | HIS | 3.0 |
|  | ILE | 4.7 |
|  | LEU | 12.1 |
|  | LYS | 8.3 |
|  | THR | 4.7 |
|  | TRP | 3.4 |
|  | TYR + PHE | 11.2 |
|  | VAL | 4.0 |
| 17 | CYS + MET | 4.6 |
|  | HIS | 3.1 |
|  | ILE | 5.2 |
|  | LEU | 12.1 |
|  | LYS | 8.2 |
|  | THR | 4.6 |
|  | TRP | 3.0 |
|  | TYR + PHE | 11.0 |
|  | VAL | 3.9 |
| 18 | CYS + MET | 3.7 |
|  | HIS | 2.8 |
|  | ILE | 4.2 |
|  | LEU | 12.0 |
|  | LYS | 8.3 |
|  | THR | 4.7 |
|  | TRP | 3.8 |
|  | TYR + PHE | 11.4 |
|  | VAL | 4.0 |

Example 6—Nutritionally Optimized Collagen Peptides of the Bovine α1-Chain of Collagen Type I with a Defined Minimum PDCAAS Value As described in Example 4, based on the natural amino acid sequence of the α1 chain of bovine collagen type I, a conservative amino acid exchange of non-essential amino acids was carried out, i.e. non-essential hydrophobic amino acids were preferably exchanged for hydrophobic essential amino acids. The exchange for polar, aliphatic and aromatic amino acids was carried out in the same way. Care was also taken to ensure that the amino acid motif (Gly-X-Y) remains intact and that the prolines or 4-hydroxyprolines located at the variable positions X and Y in the natural sequence are not exchanged. The aim of the amino acid exchange was to provide collagen peptides with a PDCAAS value of at least 0.4 or at least 0.6 (each determined according to Table 1). As in Example 4, the percentage of essential amino acids (% by weight based on the total weight of the collagen peptide) was calculated (see Table 6) for the collagen peptides according to the invention with a size of approx. 90 kDa, comprising 1014 amino acids (PDCAAS value at least 0.4: SEQ ID NO: 23, PDCAAS value at least 0.6: SEQ ID NO: 26) and for the two halves each containing 507 amino acids (PDCAAS value at least 0.4: SEQ ID NO: 24 and 25, PDCAAS value at least 0.6: SEQ ID NO: 27 and 28).

TABLE 6

Nutritionally optimized collagen peptides derived from bovine collagen
type I with a PDCAAS value of at least 0.4 (SEQ ID No. 23, 24, 25)
and PDCAAS value of at least 0.6 (SEQ ID No. 26, 27, 28)

| SEQ ID No. | Percentage of essential amino acids (% by weight based on the total weight of the collagen peptide) | |
|---|---|---|
| 23 | CYS + MET | 1.2 |
|  | HIS | 0.9 |
|  | ILE | 1.4 |
|  | LEU | 2.6 |
|  | LYS | 5.1 |
|  | THR | 1.8 |
|  | TRP | 0.8 |
|  | TYR + PHE | 2.7 |
|  | VAL | 1.8 |
| 24 | CYS + MET | 1.4 |
|  | HIS | 0.9 |
|  | ILE | 1.2 |
|  | LEU | 2.7 |
|  | LYS | 5.2 |
|  | THR | 1.6 |
|  | TRP | 0.8 |
|  | TYR + PHE | 3.0 |
|  | VAL | 1.5 |
| 25 | CYS + MET | 1.1 |
|  | HIS | 0.9 |
|  | ILE | 1.5 |
|  | LEU | 2.5 |
|  | LYS | 4.9 |
|  | THR | 2.0 |
|  | TRP | 0.8 |
|  | TYR + PHE | 2.4 |
|  | VAL | 2.0 |
| 26 | CYS + MET | 1.5 |
|  | HIS | 1.8 |
|  | ILE | 2.1 |
|  | LEU | 4.3 |
|  | LYS | 5.0 |
|  | THR | 2.1 |
|  | TRP | 0.8 |
|  | TYR + PHE | 4.7 |
|  | VAL | 2.3 |
| 27 | CYS + MET | 1.6 |
|  | HIS | 1.5 |

TABLE 6-continued

Nutritionally optimized collagen peptides derived from bovine collagen type I with a PDCAAS value of at least 0.4 (SEQ ID No. 23, 24, 25) and PDCAAS value of at least 0.6 (SEQ ID No. 26, 27, 28)

| SEQ ID No. | | Percentage of essential amino acids (% by weight based on the total weight of the collagen peptide) |
|---|---|---|
| | ILE | 2.5 |
| | LEU | 4.2 |
| | LYS | 5.1 |
| | THR | 2.0 |
| | TRP | 0.8 |
| | TYR + PHE | 4.6 |
| | VAL | 2.2 |
| 28 | CYS + MET | 1.3 |
| | HIS | 2.1 |
| | ILE | 1.8 |
| | LEU | 4.5 |
| | LYS | 4.8 |
| | THR | 2.2 |
| | TRP | 0.8 |
| | TYR + PHE | 4.7 |
| | VAL | 2.4 |

Example 7—Bone Health

To analyze the biological activity of the collagen peptide according to the invention in terms of maintaining bone health and the prophylaxis and treatment of bone diseases, its stimulating effect on the synthesis of extracellular matrix proteins and enzymes that play a role in the structure and mineralization of the matrix is examined via osteoblasts in vitro. This is done by determining the expression of the corresponding mRNA by means of real-time PCR and a semi-quantitative evaluation (based on a control without collagen peptide).

For this purpose, human osteoblasts are first isolated from knee joints by incubating bone material under vigorous agitation at 37° C. for 1 h in Hanks' solution, supplemented with 7 mg/ml hyaluronidase type I and III-S and 5 mg/ml pronase. The digestion is then continued at 37° C. for 3-5 h in Hanks' solution supplemented with 16 mg/ml collagenase type CLS IV. The primary osteoblasts obtained are cultivated after enzymatic digestion in Ham's F12 medium, supplemented with 10% fetal calf serum, 20 U/ml penicillin-streptomycin, 50 μg/ml partricin, 0.05 mg/ml ascorbic acid and 0.15 mg/ml glutamine. Alternatively, primary osteoblasts (Article No. C-12760; 2019) may also be obtained from PromoCell GmbH, Heidelberg, Germany, for investigating the biological effectiveness. The cells are then cultivated in Ham's F12 medium, supplemented with 10% fetal calf serum, 20 U/ml penicillin-streptomycin, 50 μg/ml partricin and 0.15 mg/ml glutamine.

To investigate the biological activity, monolayer cell cultures of the isolated human osteoblasts are incubated for a period of 24 hours in a medium that is supplemented with 0.5 mg/ml of the respective collagen peptide. A control is incubated in each case in a medium without peptide. The respective mRNA expression is then determined.

Example 8—Skin Health

The stimulation of the synthesis of collagen (type I) and the proteoglycans biglycan and versican is investigated in vitro on human dermal fibroblasts (skin cells). For this purpose, the cells are incubated for 24 hours with 0.5 mg/ml of a low molecular weight or the collagen peptide according to the invention, and the expression of collagen RNA, biglycan RNA and versican RNA is then determined by real-time PCR and semi-quantitatively (based on a control without peptide).

Example 9—Cartilage Health

For the cell cultures, porcine or human chondrocytes are isolated from cartilage tissue in a known manner and sown on culture plates at a density of approximately 350,000 cells/cm$^2$. Ham's F12 medium with 10% fetal calf serum, 10 μg/ml gentamicin and 5 μg/ml amphotericin B is used as the culture medium. As an alternative to 10 μg/ml gentamicin, 10 μg/ml penicillin-streptomycin may also be used. The cultivation took place at 37° C. in an oxygen-reduced atmosphere (5% 02, 5% $CO_2$ and 90% $N_2$).

Determination of collagen biosynthesis:

The quantification of the collagen synthesized by the chondrocytes (essentially type II) is carried out by radioactive labeling with 14C-proline, which is incorporated into the collagen.

$^{14}$C-proline is first added to the culture medium and the chondrocytes are cultivated under these conditions until the time of the determination. In order to be able to distinguish the incorporated from non-incorporated $^{14}$C-proline during the detection, the isotope-containing culture medium is then replaced by pure culture medium for a period of 3 days. The culture medium is then discarded and the adherent cell layer is mixed with distilled water in order to destroy the cell membranes through osmotic stress and to release cytosolic, unbounded $^{14}$C-proline. The cell debris with the synthesized extracellular matrix is pelleted by centrifugation. The pellet is re-suspended in fresh distilled water and a xylene scintillation cocktail is added. The amount of synthesized collagen may then be quantified by detecting the $^{14}$C-Proline with a beta counter.

Alternatively, the quantification may be carried out using the Sircol Collagen Assay Kit (Article No. 054S5000, 2019, tebu-bio, Offenbach, Germany, or Biocolor Ltd., UK) according to manufacturer instructions (see Example 10).

Determination of proteoglycan biosynthesis:

The proteoglycans synthesized by the chondrocytes are quantified by means of Alcian blue staining and photometric determination of the glycosaminoglycans (GAG), which are components of the proteoglycans.

In order to determine the GAG content in the cell culture, the culture medium is first discarded and the adherent cell layer is rinsed with PBS buffer (pH 7). The cells are then fixed in a 10% formaldehyde solution in PBS at 4° C. for 2 hours. After removing the formaldehyde, the Alcian blue staining reagent (5% Alcian blue in 3% acetic acid) is applied to the cell lawn and incubated at 4° C. overnight. Unbound Alcian blue is discarded and washed out by carefully rinsing three to four times with PBS. By adding acidic guanidine solution (8 mol/l), the GAG complexes are released from the cell layer. The amount of glycosaminoglycans may then be quantified photometrically at a wavelength of 620 nm.

Alternatively, the quantification may be carried out using the Blyscan Glycosaminoglycan Assay Kit (Article No. 054B3000, 2019, tebu-bio, Offenbach, Germany, or Biocolor Ltd., UK) according to manufacturer instructions (see Example 10).

Example 10—Influence of Synthetic Collagen Peptides According to the Invention on the Biosynthesis of Matrix Proteins Cell culture:

The human cells used were obtained from tebu-bio GmbH, Offenbach, Germany. The chondrocytes (Cat. No. 402-05a) or dermal fibroblasts (Cat. No. 106-05a) were first sown in 12-well culture plates and cultured at 37° C., 5% $CO_2$ in Ham's F12 medium, to which 10% fetal calf serum, 20 U/ml penicillin-streptomycin and 50 µg/ml ascorbic acid were added. On every other day, the culture medium was replaced by new culture medium until the cells had reached 80% confluence. To investigate the influence of the collagen peptides according to the invention of SEQ ID NO: 7, 8, 9 and 10 on the biosynthesis of matrix proteins, the cell culture medium was then replaced by a special stimulation medium to which 0.5 mg/ml of the specific collagen peptides according to the invention were added.

Collagen Assay:

To investigate the collagen metabolism, the amount of newly synthesized collagen was determined after stimulating the cells with 0.5 mg/ml BCP for three weeks. The synthesized collagen was isolated using the Sircol assay (Article No. 054S5000, 2019, tebu-bio, Offenbach, Germany, or Biocolor Ltd., UK) according to the manufacturer's instructions. In brief, the culture medium was initially discarded and the adherent cell layers were digested with 0.1 mg pepsin solution in 0.5 M acetic acid at 4° C. overnight. The cell suspensions were neutralized by adding 100 µl of an acid-neutralizing reagent. The synthesized collagen was then separated off by adding 200 µl of an isolation and concentration solution with vigorous shaking at 4° C. overnight. After centrifugation (12,000 rpm, 10 min) and discarding the supernatant, the isolated collagen was resuspended in 1 ml of Sircol dye solution. After 30 minutes of shaking and another centrifugation, the collagen pellet was covered with 750 µl of cold acidic solid washing reagent. After another centrifugation, the supernatant was again discarded and the enriched collagen was taken up in 250 µl of alkaline solution. In each case 200 µl of the sample solutions were used for photometric quantification of the synthesized collagen. The absorbance was measured at a wavelength of 492 nm. The amount of collagen synthesized in each case was determined on the basis of standardized collagen solutions.

An increased collagen synthesis by dermal fibroblasts compared to untreated controls could be found, which dermal fibroblasts were incubated with the hydroxylated collagen peptides according to the invention of SEQ ID NO: 7 (27% increase), SEQ ID NO: 8 (22% increase), SEQ ID NO: 9 (21% increase), SEQ ID NO: 10 (21% increase) (FIG. 1A).

Proteoglycan Assay:

The Blyscan glycosaminoglycan assay (Article No. 054B3000, 2019, tebu-bio, Offenbach, Germany, or Biocolor Ltd., UK) was used to determine proteoglycans. The biosynthesis of proteoglycans was determined after stimulating dermal fibroblasts for two weeks. According to the manufacturer's instructions, after discarding the culture medium, the cell layers were covered with 1 ml of papain extraction solution and incubated for three hours at 65° C. with vigorous shaking. The cell suspensions were then centrifuged (10,000 g, 10 min) and the supernatants were collected. After adding 1 ml of Blyscan dye solution and shaking (30 min), the supernatants were centrifuged again (12,000 rpm, 10 min) and then discarded. The isolated proteoglycan pellets were resuspended in 500 µl of dissociation solution. A photometric determination of the synthesized proteoglycan in 200 µl sample solution was carried out at a wavelength of 656 nm in comparison to untreated control experiments.

As seen in FIG. 1B, the synthesis of proteoglycans by dermal fibroblasts was significantly increased in comparison to untreated controls when the fibroblasts were incubated with collagen peptides according to the invention of SEQ ID NO: 7 (26% increase), SEQ ID NO: 8 (22% increase), SEQ ID NO: 9 (21% increase), SEQ ID NO: 10 (22% increase).

The invention claimed is:

1. A synthetic or recombinant collagen peptide comprising at least one amino acid sequence motif (glycine-X-Y)$_n$,
wherein X and Y for each amino acid sequence motif (glycine-X-Y) are each independently a naturally occurring amino acid,
wherein n is an integer >1,
wherein at least 80% of the amino acid sequence of the collagen peptide consists of amino acid sequence motifs (glycine-X-Y) based on the number of amino acids,
wherein at least 50% of the amino acid sequence motifs (glycine-X-Y) present in the collagen peptide contain at least one amino acid selected from the group consisting of isoleucine, leucine, lysine, methionine, phenylalanine, threonine, tryptophan, valine, histidine, cysteine and tyrosine, and
wherein the collagen peptide contains at least 1.02% sulfur-containing amino acids, at least 0.73% histidine, at least 1.02% isoleucine, at least 2.24% leucine, at least 2.07% lysine, at least 1.1% threonine, at least 0.28% tryptophan, at least 1.91% tyrosine and/or phenylalanine, and at least 1.3% valine, in each case % by weight based on the total weight of the collagen peptide.

2. The synthetic or recombinant collagen peptide according to claim 1, wherein the collagen peptide comprises 10 to 30% proline, based on the total amount of amino acids of the collagen peptide.

3. The synthetic or recombinant collagen peptide according to claim 1, wherein the collagen peptide comprises 20 to 45% glycine, based on the total amount of amino acids of the collagen peptide.

4. The synthetic or recombinant collagen peptide according to claim 1, wherein X and Y for each amino acid sequence motif (glycine-X-Y) are, independently from one another, an amino acid selected from the group consisting of isoleucine, leucine, lysine, methionine, phenylalanine, threonine, tryptophan, valine, histidine, cysteine, tyrosine and proline.

5. The synthetic or recombinant collagen peptide according to claim 1, comprising one of the amino acid sequences SEQ ID NO: 1 or 2.

6. The synthetic or recombinant collagen peptide according to claim 1, comprising an amino acid sequence according to SEQ ID NO: 3 or 4.

7. The synthetic or recombinant collagen peptide according to claim 1, comprising an amino acid sequence according to SEQ ID NO: 5 to 28.

8. The synthetic or recombinant collagen peptide according to claim 1, wherein the collagen peptide has a Protein Digestibility Corrected Amino Acid Score (PDCAAS) of at least 0.4.

9. The synthetic or recombinant collagen peptide according to claim 1, wherein the collagen peptide comprises at least 10% leucine, % by weight based on the total weight of the collagen peptide.

10. The synthetic or recombinant collagen peptide according to claim 1, wherein the collagen peptide is hydroxylated.

11. The synthetic or recombinant collagen peptide according to claim 1, wherein the collagen peptide is glycosylated.

12. A method for therapeutic treatment of a human or animal subject, comprising administering to the subject the synthetic or recombinant collagen peptide according to claim 1.

13. A pharmaceutical composition comprising at least one collagen peptide according to claim 1 and at least one pharmaceutically acceptable additive.

14. A food supplement or food item comprising at least one collagen peptide according to claim 1 and at least one food-acceptable additive.

15. A cosmetic product comprising at least one collagen peptide according to claim 1 and at least one skin-friendly additive.

* * * * *

```
SEQUENCE LISTING

<160> NUMBER OF SEQ ID NOS: 28

<210> SEQ ID NO 1
<211> LENGTH: 33
<212> TYPE: PRT
<213> ORGANISM: Artificial Sequence
<220> FEATURE:
<223> OTHER INFORMATION: Synthetic collagen sequence

<400> SEQUENCE: 1

Gly Ala Pro Gly Lys Asp Gly Val Arg Gly Leu Thr Gly Pro Ile Gly
1               5                   10                  15

Pro Pro Gly Pro Ala Gly Ala Pro Gly Asp Lys Gly Glu Ala Gly Pro
            20                  25                  30

Ser

<210> SEQ ID NO 2
<211> LENGTH: 33
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
```

```
<222> LOCATION: (3)..(3)
<223> OTHER INFORMATION: 4Hyp
<220> FEATURE:
<221> NAME/KEY: MOD_RES
<222> LOCATION: (18)..(18)
<223> OTHER INFORMATION: 4Hyp
<220> FEATURE:
<221> NAME/KEY: MOD_RES
<222> LOCATION: (24)..(24)
<223> OTHER INFORMATION: 4Hyp

<400> SEQUENCE: 2

Gly Ala Pro Gly Lys Asp Gly Val Arg Gly Leu Thr Gly Pro Ile Gly
1               5                   10                  15

Pro Pro Gly Pro Ala Gly Ala Pro Gly Asp Lys Gly Glu Ala Gly Pro
            20                  25                  30

Ser

<210> SEQ ID NO 3
<211> LENGTH: 19
<212> TYPE: PRT
<213> ORGANISM: Artificial Sequence
<220> FEATURE:
<223> OTHER INFORMATION: Synthetic collagen sequence

<400> SEQUENCE: 3

Lys Gly Ala Pro Gly Ala Asp Gly Pro Ala Gly Ala Pro Gly Thr Pro
1               5                   10                  15

Gly Pro Gln

<210> SEQ ID NO 4
<211> LENGTH: 19
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (4)..(4)
<223> OTHER INFORMATION: 4Hyp
<220> FEATURE:
<221> NAME/KEY: MOD_RES
<222> LOCATION: (13)..(13)
<223> OTHER INFORMATION: 4Hyp

<400> SEQUENCE: 4

Lys Gly Ala Pro Gly Ala Asp Gly Pro Ala Gly Ala Pro Gly Thr Pro
1               5                   10                  15

Gly Pro Gln

<210> SEQ ID NO 5
<211> LENGTH: 108
<212> TYPE: PRT
<213> ORGANISM: Artificial Sequence
<220> FEATURE:
<223> OTHER INFORMATION: Synthetic collagen sequence

<400> SEQUENCE: 5

Gly Val Pro Gly Tyr Thr Gly Ile Lys Gly Phe Leu Gly Ile Pro Gly
1               5                   10                  15

Tyr Pro Gly Thr Gln Gly Leu Pro Gly Leu Asn Gly Met Pro Gly Trp
            20                  25                  30

His Gly Leu Phe Gly Leu Pro Gly Pro Lys Gly Met Thr Gly Lys Val
        35                  40                  45

Gly Pro Lys Gly Ile Phe Gly Ala Pro Gly Lys Asp Gly Val Arg Gly
```

```
                  50                  55                  60
Leu Thr Gly Pro Ile Gly Pro Pro Gly Ala Gly Pro Gly Asp
 65                  70                  75                  80

Lys Gly Glu Ala Gly Pro Ser Gly Pro Phe Gly Pro Thr Gly Leu Cys
                 85                  90                  95

Gly Val Pro Gly Trp His Gly Tyr Pro Gly His Lys
                100                 105

<210> SEQ ID NO 6
<211> LENGTH: 105
<212> TYPE: PRT
<213> ORGANISM: Artificial Sequence
<220> FEATURE:
<223> OTHER INFORMATION: Synthetic collagen sequence

<400> SEQUENCE: 6

Gly Leu Thr Gly Phe Met Gly Ile Leu Gly Tyr Val Gly Pro Lys Gly
 1               5                  10                  15

Pro Thr Gly Asn His Gly Cys Pro Gly Pro His Gly Pro Ile Gly Lys
                 20                  25                  30

Phe Gly Ser Lys Gly Pro Leu Gly Trp Thr Gly Pro Ile Gly Lys Pro
             35                  40                  45

Gly Glu Val Gly Pro Met Gly Pro Thr Gly Pro Leu Gly Trp Lys Gly
         50                  55                  60

Ala Pro Gly Ala Asp Gly Pro Ala Gly Ala Pro Gly Thr Pro Gly Pro
 65                  70                  75                  80

Gln Gly Ile Leu Gly Tyr Arg Gly Val Val Gly Leu Pro Gly Phe Lys
                 85                  90                  95

Gly Tyr His Gly Phe Pro Gly Leu Lys
                100                 105

<210> SEQ ID NO 7
<211> LENGTH: 33
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (3)..(3)
<223> OTHER INFORMATION: 4Hyp
<220> FEATURE:
<221> NAME/KEY: MOD_RES
<222> LOCATION: (18)..(18)
<223> OTHER INFORMATION: 4Hyp
<220> FEATURE:
<221> NAME/KEY: MOD_RES
<222> LOCATION: (24)..(24)
<223> OTHER INFORMATION: 4Hyp

<400> SEQUENCE: 7

Gly Leu Pro Gly Lys Met Gly Val Phe Gly Leu Thr Gly Pro Ile Gly
 1               5                  10                  15

Pro Pro Gly Pro Trp Gly Val Pro Gly His Lys Gly Tyr Leu Gly Pro
                 20                  25                  30

Thr

<210> SEQ ID NO 8
<211> LENGTH: 33
<212> TYPE: PRT
<213> ORGANISM: Artificial Sequence
<220> FEATURE:
<223> OTHER INFORMATION: Synthetic collagen sequence
```

```
<220> FEATURE:
<221> NAME/KEY: MOD_RES
<222> LOCATION: (3)..(3)
<223> OTHER INFORMATION: 4Hyp
<220> FEATURE:
<221> NAME/KEY: MOD_RES
<222> LOCATION: (18)..(18)
<223> OTHER INFORMATION: 4Hyp
<220> FEATURE:
<221> NAME/KEY: MOD_RES
<222> LOCATION: (24)..(24)
<223> OTHER INFORMATION: 4Hyp

<400> SEQUENCE: 8

Gly Leu Pro Gly Lys Tyr Gly Val His Gly Leu Thr Gly Pro Leu Gly
1               5                   10                  15

Pro Pro Gly Pro Met Gly Ile Pro Gly Trp Lys Gly Phe Val Gly Pro
            20                  25                  30

Thr

<210> SEQ ID NO 9
<211> LENGTH: 35
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (3)..(3)
<223> OTHER INFORMATION: 4Hyp
<220> FEATURE:
<221> NAME/KEY: MOD_RES
<222> LOCATION: (12)..(12)
<223> OTHER INFORMATION: 4Hyp
<220> FEATURE:
<221> NAME/KEY: MOD_RES
<222> LOCATION: (21)..(21)
<223> OTHER INFORMATION: 4Hyp

<400> SEQUENCE: 9

Gly Pro Pro Gly Pro Leu Gly Met Lys Gly Leu Pro Gly Val Trp Gly
1               5                   10                  15

Pro Phe Gly Leu Pro Gly Thr Pro Gly Pro His Gly Ile Thr Gly Tyr
            20                  25                  30

Lys Gly Val
        35

<210> SEQ ID NO 10
<211> LENGTH: 35
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (3)..(3)
<223> OTHER INFORMATION: 4Hyp
<220> FEATURE:
<221> NAME/KEY: MOD_RES
<222> LOCATION: (12)..(12)
<223> OTHER INFORMATION: 4Hyp
<220> FEATURE:
<221> NAME/KEY: MOD_RES
<222> LOCATION: (21)..(21)
<223> OTHER INFORMATION: 4Hyp

<400> SEQUENCE: 10

Gly Pro Pro Gly Pro Val Gly Thr Lys Gly Leu Pro Gly Phe Tyr Gly
1               5                   10                  15
```

```
Pro Leu Gly Ile Pro Gly His Pro Gly Pro Trp Gly Met Leu Gly Thr
            20                  25                  30

Lys Gly Val
        35

<210> SEQ ID NO 11
<211> LENGTH: 63
<212> TYPE: PRT
<213> ORGANISM: Artificial Sequence
<220> FEATURE:
<223> OTHER INFORMATION: Synthetic collagen sequence

<400> SEQUENCE: 11

Gly Met Thr Gly Lys Val Gly Pro Lys Gly Ile Phe Gly Ala Pro Gly
1               5                   10                  15

Lys Asp Gly Val Arg Gly Leu Thr Gly Pro Ile Gly Pro Pro Gly Pro
            20                  25                  30

Ala Gly Ala Pro Gly Asp Lys Gly Glu Ala Gly Pro Ser Gly Pro Phe
        35                  40                  45

Gly Pro Thr Gly Leu Cys Gly Val Pro Gly Trp His Gly Tyr Pro
    50                  55                  60

<210> SEQ ID NO 12
<211> LENGTH: 86
<212> TYPE: PRT
<213> ORGANISM: Artificial Sequence
<220> FEATURE:
<223> OTHER INFORMATION: Synthetic collagen sequence

<400> SEQUENCE: 12

Gly Leu Thr Gly Phe Met Gly Ile Leu Gly Tyr Val Gly Pro Lys Gly
1               5                   10                  15

Pro Thr Gly Asn His Gly Cys Pro Gly Pro His Gly Pro Ile Gly Lys
            20                  25                  30

Phe Gly Ser Lys Gly Pro Leu Gly Trp Thr Gly Pro Ile Gly Lys Pro
        35                  40                  45

Gly Glu Val Gly Pro Met Gly Pro Thr Gly Pro Leu Gly Trp Lys Gly
    50                  55                  60

Ala Pro Gly Ala Asp Gly Pro Ala Gly Ala Pro Gly Thr Pro Gly Pro
65                  70                  75                  80

Gln Gly Ile Leu Gly Tyr
            85

<210> SEQ ID NO 13
<211> LENGTH: 1014
<212> TYPE: PRT
<213> ORGANISM: Artificial Sequence
<220> FEATURE:
<223> OTHER INFORMATION: Synthetic collagen sequence

<400> SEQUENCE: 13

Gly Pro Met Gly Pro Thr Ile Pro Phe Gly Leu Pro Gly Pro Pro Gly
1               5                   10                  15

Ile Pro Gly Pro Met Pro Gly Phe His Gly Pro Gly Lys Pro Gly
            20                  25                  30

Glu Pro Gly Leu Tyr Gly Pro Met Gly Pro Phe Gly Ile Gly Pro
        35                  40                  45

Pro Gly Lys Lys Gly Trp Asp Gly Lys Val Gly Lys Pro Gly Arg Pro
    50                  55                  60

Gly Lys Phe Gly Pro Pro Ile Pro Met Gly Leu Arg Gly Leu Pro Gly
```

-continued

```
         65                  70                  75                  80
        Thr Val Gly Leu Pro Gly Met Tyr Gly His Phe Gly Phe Ser Gly Leu
                         85                  90                  95
        Asp His Leu Lys Gly Trp Thr His Pro Met Gly Leu Lys Gly Leu Pro
                        100                 105                 110
        Gly Tyr Pro Gly Leu His Gly Thr Pro Gly Gln Met Ile Pro Phe Gly
                        115                 120                 125
        Leu Pro Gly Glu Phe Gly Phe Pro Gly Ile Pro Ile Pro Met Gly Leu
                        130                 135                 140
        Phe Gly His Ala Gly Val Thr Gly Leu Ile Gly Thr Leu Gly Pro His
        145                 150                 155                 160
        Gly Val Arg Gly Glu Pro Gly Pro Pro Gly Pro Met Gly Leu Tyr Gly
                        165                 170                 175
        Pro Met Gly Asn Pro Gly Leu Trp Gly His Pro Gly Val Lys Gly Leu
                        180                 185                 190
        His Gly Val Pro Gly Ile Leu Gly Ile Pro Gly Phe Pro Gly Val Phe
                        195                 200                 205
        Lys Pro Thr Gly Pro His Gly Pro Met Gly Pro Pro Gly Ile Lys Gly
                        210                 215                 220
        Trp Thr Gly Tyr Pro Gly Leu Pro Gly Ser Lys Gly Cys Thr Gly Ile
        225                 230                 235                 240
        Lys Gly Lys Pro Gly Pro Tyr Gly Ile His Gly Pro Pro Gly Pro Leu
                        245                 250                 255
        Ile Lys Leu Gly Lys Arg Gly Val Phe Gly Cys Pro Gly Pro Ile Gly
                        260                 265                 270
        Leu Pro Gly Pro Met Gly Lys Arg Gly Gly Pro Gly Thr Phe Gly Phe
                        275                 280                 285
        Pro Gly Val Trp Gly Thr Val Gly Pro Tyr Gly Pro Val Ile Glu Phe
                        290                 295                 300
        Gly Val Pro Lys Pro Val Gly Pro Lys Gly Thr Pro Gly Lys Val Gly
        305                 310                 315                 320
        Phe Pro Gly Glu Ile Gly Leu Pro Gly Val Lys Gly Leu Thr Gly Thr
                        325                 330                 335
        Pro Gly Thr Pro Gly Pro Trp Gly Tyr Thr Gly Pro Pro Gly Pro Met
                        340                 345                 350
        Gly His Lys Gly Phe Pro Gly Ile Pro Gly Pro Pro Gly Val Phe Gly
                        355                 360                 365
        Lys Leu Gly Thr Met Gly Phe Pro Gly Pro Thr Gly Leu Ile Gly Glu
                        370                 375                 380
        Pro Gly Lys Leu Gly Lys Phe Gly Val Pro Gly Pro Pro Gly Thr Val
        385                 390                 395                 400
        Lys Pro Leu Gly Thr Cys Gly Glu Ile Gly Leu Lys Gly Pro Pro Gly
                        405                 410                 415
        Pro Leu Gly Pro Met Gly Lys Phe Gly Leu His Gly Pro Leu Gly Tyr
                        420                 425                 430
        Pro Gly Phe Gln Gly Leu Pro Gly Pro Lys Gly Pro Pro Gly Ile Leu
                        435                 440                 445
        Gly Lys Pro Gly Trp Gln Gly Val Pro Gly Asp Leu Gly Leu Pro Gly
                        450                 455                 460
        Pro Thr Gly Ile Phe Gly Glu Phe Gly Phe Pro Gly Glu Arg Gly Val
        465                 470                 475                 480
        Thr Gly Pro Pro Gly Pro Leu Gly Pro Phe Gly Leu His Gly Leu Pro
                        485                 490                 495
```

```
Gly Lys Trp Gly Leu Lys Gly Ile Leu Gly Thr Pro Gly Trp Pro Gly
            500                 505                 510

Thr His Gly Leu Pro Gly Leu Gln Gly Met Pro Gly Lys Phe Gly Ile
            515                 520                 525

Val His Leu Pro Gly Pro Lys Gly Asp Phe Gly Trp Leu Gly Pro Lys
        530                 535                 540

Gly Leu Lys Gly Leu Pro Gly Lys Asp Gly Val Phe Gly Trp Thr Gly
545                 550                 555                 560

Pro Ile Gly Pro Pro Gly Leu Met Gly Leu His Gly Asp Lys Gly Glu
                565                 570                 575

Leu Ile Pro Tyr Gly Pro Val Gly Lys Thr Gly Val Phe Gly Val Pro
            580                 585                 590

Gly Asp Phe Gly Glu Pro Gly Pro Ile Pro Met Gly Phe Tyr Gly
            595                 600                 605

Pro Pro Gly Val Asp Gly Lys Pro Gly Val Lys Gly Lys Pro Gly Asp
        610                 615                 620

Met Gly Val Lys Gly Asp Ile Gly Pro Pro Gly Pro Leu Gly Lys Val
625                 630                 635                 640

Gly Pro Pro Gly Pro Ile Gly Asn Val Gly Leu Pro Gly Pro Lys Gly
                645                 650                 655

Val Phe Gly Thr Trp Gly Pro Pro Gly Tyr Thr Gly Phe Pro Gly Ile
            660                 665                 670

Leu Gly Phe Val Gly Pro Pro Lys Pro Met Gly His Val Gly Pro Pro
            675                 680                 685

Gly Pro Pro Gly Ile Trp Gly Lys Glu Gly Thr Lys Gly Pro Phe Gly
            690                 695                 700

Cys Thr Gly Pro Tyr Gly Arg Pro Gly Leu Val Gly Pro Met Gly Pro
705                 710                 715                 720

Pro Gly Ile Leu Gly Lys Glu Gly Thr Lys Gly Pro Phe Gly Glu Thr
            725                 730                 735

Gly Lys Leu Gly Phe Pro Gly Glu Tyr Gly Pro Ile Gly Pro Pro Gly
            740                 745                 750

Pro Met Gly Glu Lys Gly Leu Pro Gly Val Trp Gly Pro Lys Gly Leu
            755                 760                 765

Pro Gly Thr Pro Gly Pro Met Gly Ile Val Gly His Phe Gly Val Tyr
        770                 775                 780

Gly Leu Pro Gly Gln Phe Gly Glu Phe Gly Phe Pro Gly Leu Pro Gly
785                 790                 795                 800

Ile Thr Gly Leu Pro Gly Lys Gln Gly Pro Tyr Gly Trp Ser Ile Glu
            805                 810                 815

Arg Gly Pro Pro Gly Pro Met Gly Pro Pro Gly Lys Leu Gly Pro Pro
        820                 825                 830

Gly Glu Thr Gly Phe Lys Gly Leu Pro Gly Leu Met Gly Thr Pro Gly
        835                 840                 845

Phe Asp Gly Thr Ile Gly Ala Lys Gly Asp Phe Gly Glu Thr Gly Pro
        850                 855                 860

Met Gly Pro Pro Gly Val Pro Gly Leu Pro Gly Leu Lys Gly Pro Tyr
865                 870                 875                 880

Gly Pro Ile Gly Lys Thr Gly Cys Phe Gly Leu Thr Gly Pro Val Gly
            885                 890                 895

Pro Leu Gly Pro Ile Gly His Val Gly Tyr Phe Gly Lys Trp Gly Pro
            900                 905                 910
```

His Gly Pro Arg Gly Asp Lys Gly Glu Thr Gly Glu Met Gly Asp Phe
            915                 920                 925

Gly Ile Lys Gly His Phe Gly Phe Thr Gly Leu His Gly Pro Pro Gly
            930                 935                 940

Pro His Gly Ser Pro Gly Trp Gly Pro Thr Gly Leu Tyr Gly Pro Trp
945                 950                 955                 960

Gly Gly Pro Phe Gly Pro His Gly Thr Leu Gly Thr Pro Gly Lys Asp
            965                 970                 975

Gly Leu Asn Gly Leu Pro Gly Pro Ile Gly Pro Pro Gly Phe Gly
            980                 985                 990

Phe Thr Gly Lys Leu Gly Pro Leu Gly Pro Pro Gly Pro Pro Gly Pro
            995                1000                1005

Pro Gly Pro Pro Gly Pro
    1010

<210> SEQ ID NO 14
<211> LENGTH: 507
<212> TYPE: PRT
<213> ORGANISM: Artificial Sequence
<220> FEATURE:
<223> OTHER INFORMATION: Synthetic collagen sequence

<400> SEQUENCE: 14

Gly Pro Met Gly Pro Thr Ile Pro Phe Gly Leu Pro Gly Pro Pro Gly
1               5                   10                  15

Ile Pro Gly Pro Met Pro Gly Phe His Gly Pro Pro Gly Lys Pro Gly
            20                  25                  30

Glu Pro Gly Leu Tyr Gly Pro Met Gly Pro Phe Gly Pro Ile Gly Pro
            35                  40                  45

Pro Gly Lys Lys Gly Trp Asp Gly Lys Val Gly Lys Pro Gly Arg Pro
            50                  55                  60

Gly Lys Phe Gly Pro Pro Ile Pro Met Gly Leu Arg Gly Leu Pro Gly
65                  70                  75                  80

Thr Val Gly Leu Pro Gly Met Tyr Gly His Phe Gly Phe Ser Gly Leu
                85                  90                  95

Asp His Leu Lys Gly Trp Thr His Pro Met Gly Leu Lys Gly Leu Pro
            100                 105                 110

Gly Tyr Pro Gly Leu His Gly Thr Pro Gly Gln Met Ile Pro Phe Gly
            115                 120                 125

Leu Pro Gly Glu Phe Gly Phe Pro Gly Ile Pro Ile Pro Met Gly Leu
            130                 135                 140

Phe Gly His Ala Gly Val Thr Gly Leu Ile Gly Thr Leu Gly Pro His
145                 150                 155                 160

Gly Val Arg Gly Glu Pro Gly Pro Pro Gly Pro Met Gly Leu Tyr Gly
                165                 170                 175

Pro Met Gly Asn Pro Gly Leu Trp Gly His Pro Gly Val Lys Gly Leu
            180                 185                 190

His Gly Val Pro Gly Ile Leu Gly Ile Pro Gly Phe Pro Gly Val Phe
            195                 200                 205

Lys Pro Thr Gly Pro His Gly Pro Met Gly Pro Pro Gly Ile Lys Gly
            210                 215                 220

Trp Thr Gly Tyr Pro Gly Leu Pro Gly Ser Lys Gly Cys Thr Gly Ile
225                 230                 235                 240

Lys Gly Lys Pro Gly Pro Tyr Gly Ile His Gly Pro Pro Gly Pro Leu
                245                 250                 255

```
Ile Lys Leu Gly Lys Arg Gly Val Phe Gly Cys Pro Gly Pro Ile Gly
            260                 265                 270

Leu Pro Gly Pro Met Gly Lys Arg Gly Gly Pro Gly Thr Phe Gly Phe
            275                 280                 285

Pro Gly Val Trp Gly Thr Val Gly Pro Tyr Gly Pro Val Ile Glu Phe
            290                 295                 300

Gly Val Pro Lys Pro Val Gly Pro Lys Gly Thr Pro Gly Lys Val Gly
305                 310                 315                 320

Phe Pro Gly Glu Ile Gly Leu Pro Gly Val Lys Gly Leu Thr Gly Thr
                325                 330                 335

Pro Gly Thr Pro Gly Pro Trp Gly Tyr Thr Gly Pro Pro Gly Pro Met
            340                 345                 350

Gly His Lys Gly Phe Pro Gly Ile Pro Gly Pro Pro Gly Val Phe Gly
            355                 360                 365

Lys Leu Gly Thr Met Gly Phe Pro Gly Pro Thr Gly Leu Ile Gly Glu
            370                 375                 380

Pro Gly Lys Leu Gly Lys Phe Gly Val Pro Gly Pro Gly Thr Val
385                 390                 395                 400

Lys Pro Leu Gly Thr Cys Gly Glu Ile Gly Leu Lys Gly Pro Pro Gly
                405                 410                 415

Pro Leu Gly Pro Met Gly Lys Phe Gly Leu His Gly Pro Leu Gly Tyr
            420                 425                 430

Pro Gly Phe Gln Gly Leu Pro Gly Pro Lys Gly Pro Pro Gly Ile Leu
            435                 440                 445

Gly Lys Pro Gly Trp Gln Gly Val Pro Gly Asp Leu Gly Leu Pro Gly
450                 455                 460

Pro Thr Gly Ile Phe Gly Glu Phe Gly Phe Pro Gly Glu Arg Gly Val
465                 470                 475                 480

Thr Gly Pro Pro Gly Pro Leu Gly Pro Phe Gly Leu His Gly Leu Pro
            485                 490                 495

Gly Lys Trp Gly Leu Lys Gly Ile Leu Gly Thr
            500                 505

<210> SEQ ID NO 15
<211> LENGTH: 507
<212> TYPE: PRT
<213> ORGANISM: Artificial Sequence
<220> FEATURE:
<223> OTHER INFORMATION: Synthetic collagen sequence

<400> SEQUENCE: 15

Pro Gly Trp Pro Gly Thr His Gly Leu Pro Gly Leu Gln Gly Met Pro
1               5                   10                  15

Gly Lys Phe Gly Ile Val His Leu Pro Gly Pro Lys Gly Asp Phe Gly
            20                  25                  30

Trp Leu Gly Pro Lys Gly Leu Lys Gly Leu Pro Gly Lys Asp Gly Val
            35                  40                  45

Phe Gly Trp Thr Gly Pro Ile Gly Pro Pro Gly Leu Met Gly Leu His
        50                  55                  60

Gly Asp Lys Gly Glu Leu Ile Pro Tyr Gly Pro Val Gly Lys Thr Gly
65                  70                  75                  80

Val Phe Gly Val Pro Gly Asp Phe Gly Glu Pro Gly Pro Ile Pro
                85                  90                  95

Met Gly Phe Tyr Gly Pro Pro Gly Val Asp Lys Pro Gly Val Lys
            100                 105                 110
```

Gly Lys Pro Gly Asp Met Gly Val Lys Gly Asp Ile Gly Pro Pro Gly
            115                 120                 125

Pro Leu Gly Lys Val Gly Pro Pro Gly Pro Ile Gly Asn Val Gly Leu
130                 135                 140

Pro Gly Pro Lys Gly Val Phe Gly Thr Trp Gly Pro Pro Gly Tyr Thr
145                 150                 155                 160

Gly Phe Pro Gly Ile Leu Gly Phe Val Gly Pro Pro Lys Pro Met Gly
                165                 170                 175

His Val Gly Pro Pro Gly Pro Pro Ile Trp Gly Lys Glu Gly Thr
            180                 185                 190

Lys Gly Pro Phe Gly Cys Thr Gly Pro Tyr Gly Arg Pro Gly Leu Val
            195                 200                 205

Gly Pro Met Gly Pro Pro Gly Ile Leu Gly Lys Glu Gly Thr Lys Gly
210                 215                 220

Pro Phe Gly Glu Thr Gly Lys Leu Gly Phe Pro Gly Glu Tyr Gly Pro
225                 230                 235                 240

Ile Gly Pro Pro Gly Pro Met Gly Glu Lys Gly Leu Pro Gly Val Trp
                245                 250                 255

Gly Pro Lys Gly Leu Pro Gly Thr Pro Gly Pro Met Gly Ile Val Gly
            260                 265                 270

His Phe Gly Val Tyr Gly Leu Pro Gly Gln Phe Gly Glu Phe Gly Phe
            275                 280                 285

Pro Gly Leu Pro Gly Ile Thr Gly Leu Pro Gly Lys Gln Gly Pro Tyr
            290                 295                 300

Gly Trp Ser Ile Glu Arg Gly Pro Pro Gly Pro Met Gly Pro Pro Gly
305                 310                 315                 320

Lys Leu Gly Pro Pro Gly Glu Thr Gly Phe Lys Gly Leu Pro Gly Leu
                325                 330                 335

Met Gly Thr Pro Gly Phe Asp Gly Thr Ile Gly Ala Lys Gly Asp Phe
            340                 345                 350

Gly Glu Thr Gly Pro Met Gly Pro Pro Gly Val Pro Gly Leu Pro Gly
            355                 360                 365

Leu Lys Gly Pro Tyr Gly Pro Ile Gly Lys Thr Gly Cys Phe Gly Leu
370                 375                 380

Thr Gly Pro Val Gly Pro Leu Gly Pro Ile Gly His Val Gly Tyr Phe
385                 390                 395                 400

Gly Lys Trp Gly Pro His Gly Pro Arg Gly Asp Lys Gly Glu Thr Gly
                405                 410                 415

Glu Met Gly Asp Phe Gly Ile Lys Gly His Phe Gly Phe Thr Gly Leu
            420                 425                 430

His Gly Pro Pro Gly Pro His Gly Ser Pro Gly Trp Gly Pro Thr Gly
            435                 440                 445

Leu Tyr Gly Pro Trp Gly Gly Pro Phe Gly Pro His Gly Thr Leu Gly
450                 455                 460

Thr Pro Gly Lys Asp Gly Leu Asn Gly Leu Pro Gly Pro Ile Gly Pro
465                 470                 475                 480

Pro Gly Pro Phe Gly Phe Thr Gly Lys Leu Gly Pro Leu Gly Pro Pro
                485                 490                 495

Gly Pro Pro Gly Pro Pro Gly Pro Pro Gly Pro
            500                 505

<210> SEQ ID NO 16
<211> LENGTH: 1014
<212> TYPE: PRT

<213> ORGANISM: Artificial Sequence
<220> FEATURE:
<223> OTHER INFORMATION: Synthetic collagen sequence

<400> SEQUENCE: 16

```
Gly Pro Met Gly Pro Thr Ile Pro Phe Gly Leu Pro Gly Pro Pro Gly
1               5                   10                  15

Ile Pro Gly Pro Met Pro Gly Phe Leu Gly Pro Pro Gly Lys Pro Gly
            20                  25                  30

Leu Pro Gly Leu Tyr Gly Pro Met Gly Pro Phe Gly Pro Ile Gly Pro
        35                  40                  45

Pro Gly Lys Lys Gly Trp Asp Gly Lys Val Gly Lys Pro Gly Arg Pro
    50                  55                  60

Gly Lys Phe Gly Pro Pro Ile Pro Met Gly Leu Arg Gly Leu Pro Gly
65                  70                  75                  80

Thr Val Gly Leu Pro Gly Met Tyr Gly His Phe Gly Phe Ser Gly Leu
                85                  90                  95

Leu His Leu Lys Gly Trp Thr His Pro Met Gly Leu Lys Gly Leu Pro
            100                 105                 110

Gly Tyr Pro Gly Leu His Gly Thr Pro Gly Gln Met Ile Pro Phe Gly
        115                 120                 125

Leu Pro Gly Leu Phe Gly Phe Pro Gly Ile Pro Ile Pro Met Gly Leu
    130                 135                 140

Phe Gly Leu Ala Gly Val Thr Gly Leu Ile Gly Thr Leu Gly Pro His
145                 150                 155                 160

Gly Val Arg Gly Leu Pro Gly Pro Pro Gly Pro Met Gly Leu Tyr Gly
                165                 170                 175

Pro Met Gly Asn Pro Gly Leu Trp Gly His Pro Gly Val Lys Gly Leu
            180                 185                 190

His Gly Val Pro Gly Ile Leu Gly Ile Pro Gly Phe Pro Gly Val Phe
        195                 200                 205

Lys Pro Thr Gly Pro His Gly Pro Met Gly Pro Pro Gly Ile Lys Gly
    210                 215                 220

Trp Thr Gly Tyr Pro Gly Leu Pro Gly Ser Lys Gly Cys Thr Gly Ile
225                 230                 235                 240

Lys Gly Lys Pro Gly Pro Tyr Gly Ile His Gly Pro Pro Gly Pro Leu
                245                 250                 255

Ile Lys Leu Gly Lys Arg Gly Val Phe Gly Cys Pro Gly Pro Ile Gly
            260                 265                 270

Leu Pro Gly Pro Met Gly Lys Arg Gly Gly Pro Gly Thr Phe Gly Phe
        275                 280                 285

Pro Gly Val Trp Gly Thr Val Gly Pro Tyr Gly Pro Val Ile Leu Phe
    290                 295                 300

Gly Val Pro Lys Pro Val Gly Pro Lys Gly Thr Pro Gly Lys Val Gly
305                 310                 315                 320

Phe Pro Gly Leu Ile Gly Leu Pro Gly Val Lys Gly Leu Thr Gly Thr
                325                 330                 335

Pro Gly Thr Pro Gly Pro Trp Gly Tyr Thr Gly Pro Pro Gly Pro Met
            340                 345                 350

Gly Leu Lys Gly Phe Pro Gly Ile Pro Gly Pro Pro Gly Val Phe Gly
        355                 360                 365

Lys Leu Gly Thr Met Gly Phe Pro Gly Pro Thr Gly Leu Ile Gly Leu
    370                 375                 380

Pro Gly Lys Leu Gly Lys Phe Gly Val Pro Gly Pro Pro Gly Thr Val
```

-continued

```
              385                 390                 395                 400
Lys Pro Leu Gly Thr Cys Gly Glu Ile Gly Leu Lys Gly Pro Pro Gly
                405                 410                 415

Pro Leu Gly Pro Met Gly Lys Phe Gly Leu His Gly Pro Leu Gly Tyr
                420                 425                 430

Pro Gly Phe Gln Gly Leu Pro Gly Pro Lys Gly Pro Pro Gly Ile Leu
                435                 440                 445

Gly Lys Pro Gly Trp Gln Gly Val Pro Gly Leu Leu Gly Leu Pro Gly
            450                 455                 460

Pro Thr Gly Ile Phe Gly Leu Phe Gly Phe Pro Gly Glu Arg Gly Val
465                 470                 475                 480

Thr Gly Pro Pro Gly Pro Leu Gly Pro Phe Gly Leu His Gly Leu Pro
                485                 490                 495

Gly Lys Trp Gly Leu Lys Gly Ile Leu Gly Thr Pro Gly Trp Pro Gly
                500                 505                 510

Thr His Gly Leu Pro Gly Leu Gln Gly Met Pro Gly Lys Phe Gly Ile
            515                 520                 525

Val His Leu Pro Gly Pro Lys Gly Leu Phe Gly Trp Leu Gly Pro Lys
    530                 535                 540

Gly Leu Lys Gly Leu Pro Gly Lys Asp Gly Val Phe Gly Trp Thr Gly
545                 550                 555                 560

Pro Ile Gly Pro Pro Gly Leu Met Gly Leu His Gly Asp Lys Gly Leu
                565                 570                 575

Leu Ile Pro Tyr Gly Pro Val Gly Lys Thr Gly Val Phe Gly Val Pro
                580                 585                 590

Gly Asp Phe Gly Leu Pro Gly Pro Ile Pro Met Gly Phe Tyr Gly
            595                 600                 605

Pro Pro Gly Val Leu Gly Lys Pro Gly Val Lys Gly Lys Pro Gly Asp
    610                 615                 620

Met Gly Val Lys Gly Leu Ile Gly Pro Gly Pro Leu Gly Lys Val
625                 630                 635                 640

Gly Pro Pro Gly Pro Ile Gly Asn Val Gly Leu Pro Gly Pro Lys Gly
                645                 650                 655

Val Phe Gly Thr Trp Gly Pro Pro Gly Tyr Thr Gly Phe Pro Gly Ile
                660                 665                 670

Leu Gly Phe Val Gly Pro Pro Lys Pro Met Gly His Val Gly Pro Pro
            675                 680                 685

Gly Pro Pro Gly Ile Trp Gly Lys Leu Gly Thr Lys Gly Pro Phe Gly
    690                 695                 700

Cys Thr Gly Pro Tyr Gly Arg Pro Gly Leu Val Gly Pro Met Gly Pro
705                 710                 715                 720

Pro Gly Ile Leu Gly Lys Leu Gly Thr Lys Gly Pro Phe Gly Glu Thr
                725                 730                 735

Gly Lys Leu Gly Phe Pro Gly Leu Tyr Gly Ile Gly Pro Pro Gly
            740                 745                 750

Pro Met Gly Leu Lys Gly Leu Pro Gly Val Trp Gly Pro Lys Gly Leu
            755                 760                 765

Pro Gly Thr Pro Gly Pro Met Gly Ile Val Gly His Phe Gly Val Tyr
    770                 775                 780

Gly Leu Pro Gly Gln Phe Gly Leu Phe Gly Phe Pro Gly Leu Pro Gly
785                 790                 795                 800

Ile Thr Gly Leu Pro Gly Lys Gln Gly Pro Tyr Gly Trp Ser Ile Leu
                805                 810                 815
```

-continued

Arg Gly Pro Pro Gly Pro Met Gly Pro Pro Gly Lys Leu Gly Pro Pro
                820                 825                 830

Gly Leu Thr Gly Phe Lys Gly Leu Pro Gly Leu Met Gly Thr Pro Gly
            835                 840                 845

Phe Leu Gly Thr Ile Gly Ala Lys Gly Leu Phe Gly Leu Thr Gly Pro
        850                 855                 860

Met Gly Pro Pro Gly Val Pro Gly Leu Pro Gly Leu Lys Gly Pro Tyr
865                 870                 875                 880

Gly Pro Ile Gly Lys Thr Gly Cys Phe Gly Leu Thr Gly Pro Val Gly
                885                 890                 895

Pro Leu Gly Pro Ile Gly Leu Val Gly Tyr Phe Gly Lys Trp Gly Pro
            900                 905                 910

His Gly Pro Arg Gly Asp Lys Gly Leu Thr Gly Glu Met Gly Asp Phe
        915                 920                 925

Gly Ile Lys Gly His Phe Gly Phe Thr Gly Leu His Gly Pro Pro Gly
    930                 935                 940

Pro His Gly Ser Pro Gly Trp Gly Pro Thr Gly Leu Tyr Gly Pro Trp
945                 950                 955                 960

Gly Gly Pro Phe Gly Pro His Gly Thr Leu Gly Thr Pro Gly Lys Leu
                965                 970                 975

Gly Leu Asn Gly Leu Pro Gly Pro Ile Gly Pro Gly Pro Phe Gly
            980                 985                 990

Phe Thr Gly Lys Leu Gly Pro Leu Gly Pro Pro Gly Pro Pro Gly Pro
        995                 1000                1005

Pro Gly Pro Pro Gly Pro
    1010

<210> SEQ ID NO 17
<211> LENGTH: 507
<212> TYPE: PRT
<213> ORGANISM: Artificial Sequence
<220> FEATURE:
<223> OTHER INFORMATION: Synthetic collagen sequence

<400> SEQUENCE: 17

Gly Pro Met Gly Pro Thr Ile Pro Phe Gly Leu Pro Gly Pro Pro Gly
1               5                   10                  15

Ile Pro Gly Pro Met Pro Gly Phe Leu Gly Pro Gly Lys Pro Gly
            20                  25                  30

Leu Pro Gly Leu Tyr Gly Pro Met Gly Pro Phe Gly Ile Gly Pro
        35                  40                  45

Pro Gly Lys Lys Gly Trp Asp Gly Lys Val Gly Lys Pro Gly Arg Pro
    50                  55                  60

Gly Lys Phe Gly Pro Pro Ile Pro Met Gly Leu Arg Gly Leu Pro Gly
65                  70                  75                  80

Thr Val Gly Leu Pro Gly Met Tyr Gly His Phe Gly Phe Ser Gly Leu
                85                  90                  95

Leu His Leu Lys Gly Trp Thr His Pro Met Gly Leu Lys Gly Leu Pro
            100                 105                 110

Gly Tyr Pro Gly Leu His Gly Thr Pro Gly Gln Met Ile Pro Phe Gly
        115                 120                 125

Leu Pro Gly Leu Phe Gly Phe Pro Gly Ile Pro Ile Pro Met Gly Leu
    130                 135                 140

Phe Gly Leu Ala Gly Val Thr Gly Leu Ile Gly Thr Leu Gly Pro His
145                 150                 155                 160

Gly Val Arg Gly Leu Pro Pro Gly Pro Met Gly Leu Tyr Gly
            165                 170                 175

Pro Met Gly Asn Pro Gly Leu Trp Gly His Pro Gly Val Lys Gly Leu
            180                 185                 190

His Gly Val Pro Gly Ile Leu Gly Ile Pro Gly Phe Pro Gly Val Phe
            195                 200                 205

Lys Pro Thr Gly Pro His Gly Pro Met Gly Pro Pro Gly Ile Lys Gly
            210                 215                 220

Trp Thr Gly Tyr Pro Gly Leu Pro Gly Ser Lys Gly Cys Thr Gly Ile
225                 230                 235                 240

Lys Gly Lys Pro Gly Pro Tyr Gly Ile His Gly Pro Pro Gly Pro Leu
            245                 250                 255

Ile Lys Leu Gly Lys Arg Gly Val Phe Gly Cys Pro Gly Pro Ile Gly
            260                 265                 270

Leu Pro Gly Pro Met Gly Lys Arg Gly Gly Pro Gly Thr Phe Gly Phe
            275                 280                 285

Pro Gly Val Trp Gly Thr Val Gly Pro Tyr Gly Pro Val Ile Leu Phe
            290                 295                 300

Gly Val Pro Lys Pro Val Gly Pro Lys Gly Thr Pro Gly Lys Val Gly
305                 310                 315                 320

Phe Pro Gly Leu Ile Gly Leu Pro Gly Val Lys Gly Leu Thr Gly Thr
            325                 330                 335

Pro Gly Thr Pro Gly Pro Trp Gly Tyr Thr Gly Pro Pro Gly Pro Met
            340                 345                 350

Gly Leu Lys Gly Phe Pro Gly Ile Pro Gly Pro Pro Gly Val Phe Gly
            355                 360                 365

Lys Leu Gly Thr Met Gly Phe Pro Gly Pro Thr Gly Leu Ile Gly Leu
            370                 375                 380

Pro Gly Lys Leu Gly Lys Phe Gly Val Pro Gly Pro Pro Gly Thr Val
385                 390                 395                 400

Lys Pro Leu Gly Thr Cys Gly Glu Ile Gly Leu Lys Gly Pro Pro Gly
            405                 410                 415

Pro Leu Gly Pro Met Gly Lys Phe Gly Leu His Gly Pro Leu Gly Tyr
            420                 425                 430

Pro Gly Phe Gln Gly Leu Pro Gly Lys Gly Pro Gly Ile Leu
            435                 440                 445

Gly Lys Pro Gly Trp Gln Gly Val Pro Gly Leu Leu Gly Leu Pro Gly
450                 455                 460

Pro Thr Gly Ile Phe Gly Leu Phe Gly Phe Pro Gly Glu Arg Gly Val
465                 470                 475                 480

Thr Gly Pro Pro Gly Pro Leu Gly Pro Phe Gly Leu His Gly Leu Pro
            485                 490                 495

Gly Lys Trp Gly Leu Lys Gly Ile Leu Gly Thr
            500                 505

<210> SEQ ID NO 18
<211> LENGTH: 507
<212> TYPE: PRT
<213> ORGANISM: Artificial Sequence
<220> FEATURE:
<223> OTHER INFORMATION: Synthetic collagen sequence

<400> SEQUENCE: 18

Pro Gly Trp Pro Gly Thr His Gly Leu Pro Gly Leu Gln Gly Met Pro
1               5                   10                  15

```
Gly Lys Phe Gly Ile Val His Leu Pro Gly Lys Gly Leu Phe Gly
            20                  25                  30

Trp Leu Gly Pro Lys Gly Leu Lys Gly Leu Pro Gly Lys Asp Gly Val
        35                  40                  45

Phe Gly Trp Thr Gly Pro Ile Gly Pro Pro Gly Leu Met Gly Leu His
    50                  55                  60

Gly Asp Lys Gly Leu Leu Ile Pro Tyr Gly Pro Val Gly Lys Thr Gly
 65                 70                  75                  80

Val Phe Gly Val Pro Gly Asp Phe Gly Leu Pro Gly Pro Pro Ile Pro
                85                  90                  95

Met Gly Phe Tyr Gly Pro Pro Gly Val Leu Gly Lys Pro Gly Val Lys
                100                 105                 110

Gly Lys Pro Gly Asp Met Gly Val Lys Gly Leu Ile Gly Pro Pro Gly
            115                 120                 125

Pro Leu Gly Lys Val Gly Pro Pro Gly Pro Ile Gly Asn Val Gly Leu
    130                 135                 140

Pro Gly Pro Lys Gly Val Phe Gly Thr Trp Gly Pro Pro Gly Tyr Thr
145                 150                 155                 160

Gly Phe Pro Gly Ile Leu Gly Phe Val Gly Pro Pro Lys Pro Met Gly
                165                 170                 175

His Val Gly Pro Pro Gly Pro Pro Gly Ile Trp Gly Lys Leu Gly Thr
            180                 185                 190

Lys Gly Pro Phe Gly Cys Thr Gly Pro Tyr Gly Arg Pro Gly Leu Val
        195                 200                 205

Gly Pro Met Gly Pro Pro Gly Ile Leu Gly Lys Leu Gly Thr Lys Gly
    210                 215                 220

Pro Phe Gly Glu Thr Gly Lys Leu Gly Phe Pro Gly Leu Tyr Gly Pro
225                 230                 235                 240

Ile Gly Pro Pro Gly Pro Met Gly Leu Lys Gly Leu Pro Gly Val Trp
                245                 250                 255

Gly Pro Lys Gly Leu Pro Gly Thr Pro Gly Pro Met Gly Ile Val Gly
            260                 265                 270

His Phe Gly Val Tyr Gly Leu Pro Gly Gln Phe Gly Leu Phe Gly Phe
        275                 280                 285

Pro Gly Leu Pro Gly Ile Thr Gly Leu Pro Gly Lys Gln Gly Pro Tyr
    290                 295                 300

Gly Trp Ser Ile Leu Arg Gly Pro Pro Gly Pro Met Gly Pro Pro Gly
305                 310                 315                 320

Lys Leu Gly Pro Pro Gly Leu Thr Gly Phe Lys Gly Leu Pro Gly Leu
                325                 330                 335

Met Gly Thr Pro Gly Phe Leu Gly Thr Ile Gly Ala Lys Gly Leu Phe
            340                 345                 350

Gly Leu Thr Gly Pro Met Gly Pro Gly Val Pro Gly Leu Pro Gly
        355                 360                 365

Leu Lys Gly Pro Tyr Gly Pro Ile Gly Lys Thr Gly Cys Phe Gly Leu
    370                 375                 380

Thr Gly Pro Val Gly Pro Leu Gly Pro Ile Gly Leu Val Gly Tyr Phe
385                 390                 395                 400

Gly Lys Trp Gly Pro His Gly Pro Arg Gly Asp Lys Gly Leu Thr Gly
                405                 410                 415

Glu Met Gly Asp Phe Gly Ile Lys Gly His Phe Gly Phe Gly Thr Gly Leu
            420                 425                 430
```

```
His Gly Pro Pro Gly Pro His Gly Ser Pro Gly Trp Gly Pro Thr Gly
            435                 440                 445

Leu Tyr Gly Pro Trp Gly Gly Pro Phe Gly Pro His Gly Thr Leu Gly
        450                 455                 460

Thr Pro Gly Lys Leu Gly Leu Asn Gly Leu Pro Gly Pro Ile Gly Pro
465                 470                 475                 480

Pro Gly Pro Phe Gly Phe Thr Gly Lys Leu Gly Pro Leu Gly Pro Pro
                485                 490                 495

Gly Pro Pro Gly Pro Pro Gly Pro Gly Pro
            500                 505
```

```
<210> SEQ ID NO 19
<211> LENGTH: 108
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (3)..(3)
<223> OTHER INFORMATION: 4Hyp
<220> FEATURE:
<221> NAME/KEY: MOD_RES
<222> LOCATION: (15)..(15)
<223> OTHER INFORMATION: 4Hyp
<220> FEATURE:
<221> NAME/KEY: MOD_RES
<222> LOCATION: (18)..(18)
<223> OTHER INFORMATION: 4Hyp
<220> FEATURE:
<221> NAME/KEY: MOD_RES
<222> LOCATION: (24)..(24)
<223> OTHER INFORMATION: 4Hyp
<220> FEATURE:
<221> NAME/KEY: MOD_RES
<222> LOCATION: (30)..(30)
<223> OTHER INFORMATION: 4Hyp
<220> FEATURE:
<221> NAME/KEY: MOD_RES
<222> LOCATION: (57)..(57)
<223> OTHER INFORMATION: 4Hyp
<220> FEATURE:
<221> NAME/KEY: MOD_RES
<222> LOCATION: (72)..(72)
<223> OTHER INFORMATION: 4Hyp
<220> FEATURE:
<221> NAME/KEY: MOD_RES
<222> LOCATION: (78)..(78)
<223> OTHER INFORMATION: 4Hyp
<220> FEATURE:
<221> NAME/KEY: MOD_RES
<222> LOCATION: (89)..(89)
<223> OTHER INFORMATION: 4Hyp
<220> FEATURE:
<221> NAME/KEY: MOD_RES
<222> LOCATION: (99)..(99)
<223> OTHER INFORMATION: 4Hyp
<220> FEATURE:
<221> NAME/KEY: MOD_RES
<222> LOCATION: (105)..(105)
<223> OTHER INFORMATION: 4Hyp

<400> SEQUENCE: 19

Gly Val Pro Gly Tyr Thr Gly Ile Lys Gly Phe Leu Gly Ile Pro Gly
1               5                  10                  15

Tyr Pro Gly Thr Gln Gly Leu Pro Gly Leu Asn Gly Met Pro Gly Trp
                20                  25                  30

His Gly Leu Phe Gly Leu Pro Gly Pro Lys Gly Met Thr Gly Lys Val
            35                  40                  45

Gly Pro Lys Gly Ile Phe Gly Ala Pro Gly Lys Asp Gly Val Arg Gly
```

```
                    50                  55                  60

Leu Thr Gly Pro Ile Gly Pro Pro Gly Ala Gly Pro Gly Asp
 65                  70                  75                  80

Lys Gly Glu Ala Gly Pro Ser Gly Pro Phe Gly Pro Thr Gly Leu Cys
                     85                  90                  95

Gly Val Pro Gly Trp His Gly Tyr Pro Gly His Lys
                100                 105

<210> SEQ ID NO 20
<211> LENGTH: 105
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (24)..(24)
<223> OTHER INFORMATION: 4Hyp
<220> FEATURE:
<221> NAME/KEY: MOD_RES
<222> LOCATION: (48)..(48)
<223> OTHER INFORMATION: 4Hyp
<220> FEATURE:
<221> NAME/KEY: MOD_RES
<222> LOCATION: (66)..(66)
<223> OTHER INFORMATION: 4Hyp
<220> FEATURE:
<221> NAME/KEY: MOD_RES
<222> LOCATION: (75)..(75)
<223> OTHER INFORMATION: 4Hyp
<220> FEATURE:
<221> NAME/KEY: MOD_RES
<222> LOCATION: (93)..(93)
<223> OTHER INFORMATION: 4Hyp
<220> FEATURE:
<221> NAME/KEY: MOD_RES
<222> LOCATION: (102)..(102)
<223> OTHER INFORMATION: 4Hyp

<400> SEQUENCE: 20

Gly Leu Thr Gly Phe Met Gly Ile Leu Gly Tyr Val Gly Pro Lys Gly
  1               5                  10                  15

Pro Thr Gly Asn His Gly Cys Pro Gly Pro His Gly Pro Ile Gly Lys
                 20                  25                  30

Phe Gly Ser Lys Gly Pro Leu Gly Trp Thr Gly Pro Ile Gly Lys Pro
             35                  40                  45

Gly Glu Val Gly Pro Met Gly Pro Thr Gly Pro Leu Gly Trp Lys Gly
         50                  55                  60

Ala Pro Gly Ala Asp Gly Pro Ala Gly Ala Pro Gly Thr Pro Gly Pro
 65                  70                  75                  80

Gln Gly Ile Leu Gly Tyr Arg Gly Val Val Gly Leu Pro Gly Phe Lys
                 85                  90                  95

Gly Tyr His Gly Phe Pro Gly Leu Lys
            100                 105

<210> SEQ ID NO 21
<211> LENGTH: 63
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (15)..(15)
<223> OTHER INFORMATION: 4Hyp
<220> FEATURE:
<221> NAME/KEY: MOD_RES
```

```
<222> LOCATION: (30)..(30)
<223> OTHER INFORMATION: 4Hyp
<220> FEATURE:
<221> NAME/KEY: MOD_RES
<222> LOCATION: (36)..(36)
<223> OTHER INFORMATION: 4Hyp
<220> FEATURE:
<221> NAME/KEY: MOD_RES
<222> LOCATION: (47)..(47)
<223> OTHER INFORMATION: 4Hyp
<220> FEATURE:
<221> NAME/KEY: MOD_RES
<222> LOCATION: (57)..(57)
<223> OTHER INFORMATION: 4Hyp
<220> FEATURE:
<221> NAME/KEY: MOD_RES
<222> LOCATION: (63)..(63)
<223> OTHER INFORMATION: 4Hyp

<400> SEQUENCE: 21

Gly Met Thr Gly Lys Val Gly Pro Lys Gly Ile Phe Gly Ala Pro Gly
1               5                   10                  15

Lys Asp Gly Val Arg Gly Leu Thr Gly Pro Ile Gly Pro Pro Gly Pro
            20                  25                  30

Ala Gly Ala Pro Gly Asp Lys Gly Glu Ala Gly Pro Ser Gly Pro Phe
        35                  40                  45

Gly Pro Thr Gly Leu Cys Gly Val Pro Gly Trp His Gly Tyr Pro
    50                  55                  60

<210> SEQ ID NO 22
<211> LENGTH: 86
<212> TYPE: PRT
<213> ORGANISM: Artificial Sequence
<220> FEATURE:
<223> OTHER INFORMATION: Synthetic collagen sequence
<220> FEATURE:
<221> NAME/KEY: MOD_RES
<222> LOCATION: (24)..(24)
<223> OTHER INFORMATION: 4Hyp
<220> FEATURE:
<221> NAME/KEY: MOD_RES
<222> LOCATION: (48)..(48)
<223> OTHER INFORMATION: 4Hyp
<220> FEATURE:
<221> NAME/KEY: MOD_RES
<222> LOCATION: (66)..(66)
<223> OTHER INFORMATION: 4Hyp
<220> FEATURE:
<221> NAME/KEY: MOD_RES
<222> LOCATION: (75)..(75)
<223> OTHER INFORMATION: 4Hyp

<400> SEQUENCE: 22

Gly Leu Thr Gly Phe Met Gly Ile Leu Gly Tyr Val Gly Pro Lys Gly
1               5                   10                  15

Pro Thr Gly Asn His Gly Cys Pro Gly Pro His Gly Pro Ile Gly Lys
            20                  25                  30

Phe Gly Ser Lys Gly Pro Leu Gly Trp Thr Gly Pro Ile Gly Lys Pro
        35                  40                  45

Gly Glu Val Gly Pro Met Gly Pro Thr Gly Pro Leu Gly Trp Lys Gly
    50                  55                  60

Ala Pro Gly Ala Asp Gly Pro Ala Gly Ala Pro Gly Thr Pro Gly Pro
65                  70                  75                  80

Gln Gly Ile Leu Gly Tyr
                85

<210> SEQ ID NO 23
```

```
<211> LENGTH: 1014
<212> TYPE: PRT
<213> ORGANISM: Artificial sequence
<220> FEATURE:
<223> OTHER INFORMATION: Synthetic collagen sequence

<400> SEQUENCE: 23
```

| | | | | | | | | | | | | | | |
|---|---|---|---|---|---|---|---|---|---|---|---|---|---|---|
|Gly|Pro|Met|Gly|Pro|Ser|Gly|Pro|Arg|Gly|Leu|Pro|Gly|Pro|Gly|
|1| | | |5| | | | |10| | | | |15|
|Ala|Pro|Gly|Pro|Gln|Gly|Phe|Gln|Gly|Pro|Pro|Gly|Glu|Pro|Gly|Glu|
| | | |20| | | | |25| | | | |30| | |
|Pro|Gly|Ala|Ser|Gly|Pro|Met|Gly|Pro|Arg|Gly|Pro|Pro|Gly|Pro|Pro|
| | | | |35| | | | |40| | | | |45| |
|Gly|Lys|Asn|Gly|Asp|Asp|Gly|Glu|Ile|Gly|Lys|Pro|Gly|Arg|Pro|Gly|
| |50| | | | |55| | | | |60| | | | |
|Glu|Arg|Gly|Pro|Pro|Gly|Pro|Gln|Gly|Ala|Arg|Gly|Leu|Pro|Gly|Thr|
|65| | | | |70| | | | |75| | | | |80|
|Ala|Gly|Leu|Pro|Gly|Met|Lys|Gly|His|Arg|Gly|Phe|Ser|Gly|Leu|Asp|
| | | | |85| | | | |90| | | | |95| |
|Gly|Ala|Lys|Gly|Asp|Ala|Gly|Pro|Ala|Gly|Pro|Lys|Gly|Glu|Pro|Gly|
| | | |100| | | | |105| | | | |110| | |
|Ser|Pro|Gly|Glu|Asn|Gly|Ala|Pro|Gly|His|Met|Gly|Pro|Arg|Gly|Leu|
| | | | |115| | | | |120| | | | |125| |
|Pro|Gly|Glu|Arg|Gly|Arg|Pro|Gly|Ile|Pro|Gly|Pro|Ala|Gly|Ala|Arg|
| | |130| | | | |135| | | | |140| | | |
|Gly|Asn|Asp|Gly|Ala|Thr|Gly|Ala|Ala|Gly|Pro|Pro|Gly|Pro|Thr|Gly|
|145| | | | |150| | | | |155| | | | |160|
|Pro|Ala|Gly|Pro|Pro|Gly|Phe|Pro|Gly|Ala|Val|Gly|Ala|Lys|Gly|Glu|
| | | | |165| | | | |170| | | | |175| |
|Gly|Gly|Pro|Gln|Gly|Pro|Arg|Gly|Ser|Glu|Gly|Pro|Gln|Gly|Val|Arg|
| | | |180| | | | |185| | | | |190| | |
|Gly|Glu|Pro|Gly|Pro|Pro|Gly|Pro|Ala|Gly|Ala|Trp|Gly|Pro|Ala|Gly|
| | | | |195| | | | |200| | | | |205| |
|Asn|Pro|Gly|Ala|Asp|Gly|Gln|Pro|Gly|Ala|Lys|Gly|Ala|Asn|Gly|Ala|
|210| | | | |215| | | | |220| | | | | |
|Pro|Gly|Ile|Ala|Gly|Ala|Pro|Gly|Phe|Pro|Gly|Ala|Arg|Gly|Pro|Ser|
|225| | | | |230| | | | |235| | | | |240|
|Gly|Pro|Gln|Gly|Pro|Ser|Gly|Pro|Pro|Gly|Pro|Lys|Gly|Asn|Ser|Gly|
| | | | |245| | | | |250| | | | |255| |
|Glu|Pro|Gly|Ala|Pro|Gly|Ser|Lys|Gly|Asp|Thr|Gly|Ala|Lys|Gly|Glu|
| | | |260| | | | |265| | | | |270| | |
|Pro|Gly|Pro|Thr|Gly|Ile|Gln|Gly|Pro|Pro|Gly|Pro|Ala|Gly|Glu|Glu|
| | |275| | | | |280| | | | |285| | | |
|Gly|Lys|Arg|Gly|Ala|Arg|Gly|Glu|Pro|Gly|Pro|Ile|Gly|Leu|Pro|Gly|
| |290| | | | |295| | | | |300| | | | |
|Pro|Pro|Gly|Glu|Arg|Gly|Gly|Pro|Gly|Ser|Arg|Gly|Phe|Pro|Gly|Ala|
|305| | | | |310| | | | |315| | | | |320|
|Asp|Gly|Val|Ala|Gly|Pro|Lys|Gly|Pro|Ala|Gly|Glu|Arg|Gly|Ala|Pro|
| | | | |325| | | | |330| | | | |335| |
|Gly|Pro|Ala|Gly|Pro|Lys|Gly|Ser|Pro|Gly|Glu|Ala|Gly|Arg|Pro|Gly|
| | | |340| | | | |345| | | | |350| | |
|Glu|Ala|Gly|Leu|Pro|Gly|Ala|Lys|Gly|Leu|Thr|Gly|Tyr|Pro|Gly|Ser|
| | | | |355| | | | |360| | | | |365| |
|Pro|Gly|Pro|Asp|Gly|Lys|Thr|Gly|Pro|Pro|Gly|Pro|Ala|Gly|Gln|Asp|
| | |370| | | | |375| | | | |380| | | |

```
Gly Arg Pro Gly Pro Gly Pro Gly Ala Arg Gly His Ala Gly
385                 390                 395                 400

Val Met Gly Phe Pro Gly Pro Lys Gly Ala Ala Gly Glu Pro Gly Lys
                405                 410                 415

Ala Gly Glu Arg Gly Val Pro Gly Pro Pro Gly Ala Val Gly Pro Leu
            420                 425                 430

Gly Lys Asp Gly Glu Ala Gly Ala Gln Gly Pro Pro Gly Pro Ala Gly
            435                 440                 445

Pro Ala Gly Glu Arg Gly Glu Gln Gly Pro Ala Gly Ser Pro Gly Phe
    450                 455                 460

Trp Gly Leu Pro Gly Pro Ala Gly Pro Gly Glu Ala Gly Lys Pro
465                 470                 475                 480

Gly Glu Gln Gly Val Pro Gly Asp Leu Gly Ala Pro Gly Pro Ser Gly
                485                 490                 495

Ala Arg Gly Glu Arg Gly Phe Pro Gly Glu Arg Gly Val Gln Gly Pro
            500                 505                 510

Pro Gly Pro Ala Gly Pro Arg Gly Ala Asn Gly Ala Pro Gly Asn Asp
    515                 520                 525

Gly Ala Lys Gly Asp Ala Gly Ala Pro Gly Ala Pro Gly Ser Gln Gly
            530                 535                 540

Ala Pro Gly Leu His Gly Met Pro Gly Glu Arg Gly Ala Ala Gly Leu
545                 550                 555                 560

Pro Gly Pro Lys Gly Asp Arg Gly Asp Leu Gly Pro Lys Gly Ala Asp
                565                 570                 575

Gly Ala Pro Gly Lys Asp Gly Val Arg Gly Leu Thr Gly Pro Ile Gly
            580                 585                 590

Pro Pro Gly Pro Ala Gly Ala Pro Gly Asp Lys Gly Glu Ala Gly Pro
    595                 600                 605

Ser Gly Pro Ala Gly Pro Thr Gly Ala Arg Gly Ala Pro Gly Asp Arg
    610                 615                 620

Gly Glu Pro Gly Pro Pro Gly Pro Ala Gly Phe Ala Gly Pro Pro Gly
625                 630                 635                 640

Ala Asp Gly Gln Pro Gly Ala Lys Gly Glu Pro Gly Asp Trp Gly Ala
                645                 650                 655

Lys Gly Asp Ala Gly Pro Pro Gly Pro Ala Gly Pro Ala Gly Pro Pro
            660                 665                 670

Gly Pro Ile Gly Asn Val Gly Ala Pro Gly Pro Lys Gly Ala Arg Gly
            675                 680                 685

Ser Ala Gly Pro Pro Gly Ala Thr Gly Phe Pro Gly Ala Ala Gly Arg
    690                 695                 700

Val Gly Pro Pro Gly Pro Ser Gly Asn Ala Gly Pro Pro Gly Pro Pro
705                 710                 715                 720

Gly Pro Ala Gly Lys Glu Gly Tyr Lys Gly Pro Arg Gly Glu Thr Gly
                725                 730                 735

Pro Ala Gly Arg Pro Gly Glu Val Gly Pro Pro Gly Pro Pro Gly Pro
            740                 745                 750

Ala Gly Glu Lys Gly Ala Pro Gly Ala Asp Gly Pro Ala Gly Ala Pro
            755                 760                 765

Gly Thr Pro Gly Pro Trp Gly Ile Ala Gly Gln Arg Gly Val Val Gly
    770                 775                 780

Leu Pro Gly Gln Arg Gly Glu Arg Gly Phe Pro Gly Leu Pro Gly Pro
785                 790                 795                 800
```

```
Ser Gly Glu Pro Gly Lys His Gly Pro Ser Gly Ala Ser Gly Glu Arg
                805                 810                 815

Gly Pro Pro Gly Pro Met Gly Pro Pro Gly Leu Ala Gly Pro Pro Gly
            820                 825                 830

Glu Ser Gly Arg Glu Gly Ala Pro Gly Ala Glu Gly Ser Pro Gly Arg
        835                 840                 845

Asp Gly Cys Pro Gly Ala Lys Gly Asp Arg Gly Glu Thr Gly Pro Ala
850                 855                 860

Gly Pro Pro Gly Ala Pro Gly Ala Pro Gly Pro Pro Gly Pro Val Gly
865                 870                 875                 880

Pro Ala Gly Lys Cys Gly Asp Arg Gly Glu Thr Gly Pro Ala Gly Pro
                885                 890                 895

Ala Gly Pro Ile Gly Pro Val Gly Ala Arg Gly Pro Ala Gly Pro Gln
            900                 905                 910

Gly Pro Arg Gly Asp Lys Gly Glu Thr Gly Glu Phe Gly Asp Arg Gly
        915                 920                 925

Ile Lys Gly His Arg Gly Phe Ser Gly Leu Gln Gly Pro Pro Gly Pro
930                 935                 940

Pro Gly Ser Pro Gly Glu Gln Gly Pro Tyr Gly Ala Ser Gly Pro Ala
945                 950                 955                 960

Gly Pro Arg Gly Pro Pro Gly Ser Ala Gly Ser Pro Gly Lys Asp Gly
                965                 970                 975

Leu Asn Gly Leu Pro Gly Pro Ile Gly Pro Pro Gly Pro Arg Gly Arg
            980                 985                 990

Thr Gly Asp Ala Gly Pro Ala Gly Pro Pro Gly Pro Pro Gly Pro Pro
        995                 1000                1005

Gly Pro Pro Gly Pro Pro
    1010

<210> SEQ ID NO 24
<211> LENGTH: 507
<212> TYPE: PRT
<213> ORGANISM: Artificial sequence
<220> FEATURE:
<223> OTHER INFORMATION: Synthetic collagen sequence

<400> SEQUENCE: 24

Gly Pro Met Gly Pro Ser Gly Pro Arg Gly Leu Pro Gly Pro Pro Gly
1               5                   10                  15

Ala Pro Gly Pro Gln Gly Phe Gln Gly Pro Pro Gly Glu Pro Gly Glu
            20                  25                  30

Pro Gly Ala Ser Gly Pro Met Gly Pro Arg Gly Pro Pro Gly Pro Pro
        35                  40                  45

Gly Lys Asn Gly Asp Asp Gly Glu Ile Gly Lys Pro Gly Arg Pro Gly
50                  55                  60

Glu Arg Gly Pro Pro Gly Pro Gln Gly Ala Arg Gly Leu Pro Gly Thr
65                  70                  75                  80

Ala Gly Leu Pro Gly Met Lys Gly His Arg Gly Phe Ser Gly Leu Asp
            85                  90                  95

Gly Ala Lys Gly Asp Ala Gly Pro Ala Gly Pro Lys Gly Glu Pro Gly
        100                 105                 110

Ser Pro Gly Glu Asn Gly Ala Pro Gly His Met Gly Pro Arg Gly Leu
    115                 120                 125

Pro Gly Glu Arg Gly Arg Pro Gly Ile Pro Gly Pro Ala Gly Ala Arg
    130                 135                 140
```

-continued

Gly Asn Asp Gly Ala Thr Gly Ala Ala Gly Pro Gly Pro Thr Gly
145                 150                 155                 160

Pro Ala Gly Pro Pro Gly Phe Pro Gly Ala Val Gly Ala Lys Gly Glu
                165                 170                 175

Gly Gly Pro Gln Gly Pro Arg Gly Ser Glu Gly Pro Gln Gly Val Arg
            180                 185                 190

Gly Glu Pro Gly Pro Gly Pro Ala Gly Ala Trp Gly Pro Ala Gly
        195                 200                 205

Asn Pro Gly Ala Asp Gly Gln Pro Gly Ala Lys Gly Ala Asn Gly Ala
    210                 215                 220

Pro Gly Ile Ala Gly Ala Pro Gly Phe Pro Gly Ala Arg Gly Pro Ser
225                 230                 235                 240

Gly Pro Gln Gly Pro Ser Gly Pro Pro Gly Pro Lys Gly Asn Ser Gly
            245                 250                 255

Glu Pro Gly Ala Pro Gly Ser Lys Gly Asp Thr Gly Ala Lys Gly Glu
                260                 265                 270

Pro Gly Pro Thr Gly Ile Gln Gly Pro Pro Gly Pro Ala Gly Glu Glu
            275                 280                 285

Gly Lys Arg Gly Ala Arg Gly Glu Pro Gly Pro Ile Gly Leu Pro Gly
        290                 295                 300

Pro Pro Gly Glu Arg Gly Gly Pro Gly Ser Arg Gly Phe Pro Gly Ala
305                 310                 315                 320

Asp Gly Val Ala Gly Pro Lys Gly Pro Ala Gly Glu Arg Gly Ala Pro
                325                 330                 335

Gly Pro Ala Gly Pro Lys Gly Ser Pro Gly Glu Ala Gly Arg Pro Gly
            340                 345                 350

Glu Ala Gly Leu Pro Gly Ala Lys Gly Leu Thr Gly Tyr Pro Gly Ser
        355                 360                 365

Pro Gly Pro Asp Gly Lys Thr Gly Pro Pro Gly Pro Ala Gly Gln Asp
    370                 375                 380

Gly Arg Pro Gly Pro Pro Gly Pro Gly Ala Arg Gly His Ala Gly
385                 390                 395                 400

Val Met Gly Phe Pro Gly Pro Lys Gly Ala Ala Gly Glu Pro Gly Lys
                405                 410                 415

Ala Gly Glu Arg Gly Val Pro Gly Pro Pro Gly Ala Val Gly Pro Leu
            420                 425                 430

Gly Lys Asp Gly Glu Ala Gly Ala Gln Gly Pro Pro Gly Pro Ala Gly
        435                 440                 445

Pro Ala Gly Glu Arg Gly Glu Gln Gly Pro Ala Gly Ser Pro Gly Phe
    450                 455                 460

Trp Gly Leu Pro Gly Pro Ala Gly Pro Pro Gly Glu Ala Gly Lys Pro
465                 470                 475                 480

Gly Glu Gln Gly Val Pro Gly Asp Leu Gly Ala Pro Gly Pro Ser Gly
                485                 490                 495

Ala Arg Gly Glu Arg Gly Phe Pro Gly Glu Arg
            500                 505

<210> SEQ ID NO 25
<211> LENGTH: 507
<212> TYPE: PRT
<213> ORGANISM: Artificial sequence
<220> FEATURE:
<223> OTHER INFORMATION: Synthetic collagen sequence

<400> SEQUENCE: 25

```
Gly Val Gln Gly Pro Gly Pro Ala Gly Pro Arg Gly Ala Asn Gly
1               5                   10                  15

Ala Pro Gly Asn Asp Gly Ala Lys Gly Asp Ala Gly Ala Pro Gly Ala
            20                  25                  30

Pro Gly Ser Gln Gly Ala Pro Gly Leu His Gly Met Pro Gly Glu Arg
            35                  40                  45

Gly Ala Ala Gly Leu Pro Gly Pro Lys Gly Asp Arg Gly Asp Leu Gly
        50                  55                  60

Pro Lys Gly Ala Asp Gly Ala Pro Gly Lys Asp Gly Val Arg Gly Leu
65                  70                  75                  80

Thr Gly Pro Ile Gly Pro Pro Gly Ala Gly Ala Pro Gly Asp Lys
                85                  90                  95

Gly Glu Ala Gly Pro Ser Gly Pro Ala Gly Thr Gly Ala Arg Gly
                100                 105                 110

Ala Pro Gly Asp Arg Gly Glu Pro Gly Pro Pro Gly Pro Ala Gly Phe
            115                 120                 125

Ala Gly Pro Pro Gly Ala Asp Gly Gln Pro Gly Ala Lys Gly Glu Pro
        130                 135                 140

Gly Asp Trp Gly Ala Lys Gly Asp Ala Gly Pro Pro Gly Pro Ala Gly
145                 150                 155                 160

Pro Ala Gly Pro Pro Gly Pro Ile Gly Asn Val Gly Ala Pro Gly Pro
            165                 170                 175

Lys Gly Ala Arg Gly Ser Ala Gly Pro Pro Gly Ala Thr Gly Phe Pro
            180                 185                 190

Gly Ala Ala Gly Arg Val Gly Pro Pro Gly Pro Ser Gly Asn Ala Gly
        195                 200                 205

Pro Pro Gly Pro Pro Gly Pro Ala Gly Lys Glu Gly Tyr Lys Gly Pro
210                 215                 220

Arg Gly Glu Thr Gly Pro Ala Gly Arg Pro Gly Glu Val Gly Pro Pro
225                 230                 235                 240

Gly Pro Pro Gly Pro Ala Gly Glu Lys Gly Ala Pro Gly Ala Asp Gly
            245                 250                 255

Pro Ala Gly Ala Pro Gly Thr Pro Gly Pro Trp Gly Ile Ala Gly Gln
        260                 265                 270

Arg Gly Val Val Gly Leu Pro Gly Gln Arg Gly Glu Arg Gly Phe Pro
        275                 280                 285

Gly Leu Pro Gly Pro Ser Gly Glu Pro Gly Lys His Gly Pro Ser Gly
        290                 295                 300

Ala Ser Gly Glu Arg Gly Pro Pro Gly Pro Met Gly Pro Pro Gly Leu
305                 310                 315                 320

Ala Gly Pro Pro Gly Glu Ser Gly Arg Glu Gly Ala Pro Gly Ala Glu
            325                 330                 335

Gly Ser Pro Gly Arg Asp Gly Cys Pro Gly Ala Lys Gly Asp Arg Gly
            340                 345                 350

Glu Thr Gly Pro Ala Gly Pro Pro Gly Ala Pro Gly Ala Pro Gly Ala
        355                 360                 365

Pro Gly Pro Val Gly Pro Ala Gly Lys Cys Gly Asp Arg Gly Glu Thr
        370                 375                 380

Gly Pro Ala Gly Pro Ala Gly Pro Ile Gly Val Gly Ala Arg Gly
385                 390                 395                 400

Pro Ala Gly Pro Gln Gly Pro Arg Gly Asp Lys Gly Glu Thr Gly Glu
        405                 410                 415

Phe Gly Asp Arg Gly Ile Lys Gly His Arg Gly Phe Ser Gly Leu Gln
```

```
              420                 425                 430
Gly Pro Pro Gly Pro Gly Ser Pro Gly Glu Gln Gly Pro Tyr Gly
            435                 440                 445

Ala Ser Gly Pro Ala Gly Pro Arg Gly Pro Pro Gly Ser Ala Gly Ser
    450                 455                 460

Pro Gly Lys Asp Gly Leu Asn Gly Leu Pro Gly Pro Ile Gly Pro Pro
465                 470                 475                 480

Gly Pro Arg Gly Arg Thr Gly Asp Ala Gly Pro Ala Gly Pro Pro Gly
                485                 490                 495

Pro Pro Gly Pro Pro Gly Pro Pro Gly Pro Pro
            500                 505

<210> SEQ ID NO 26
<211> LENGTH: 1014
<212> TYPE: PRT
<213> ORGANISM: Artificial sequence
<220> FEATURE:
<223> OTHER INFORMATION: Synthetic collagen sequence

<400> SEQUENCE: 26

Gly Pro Met Gly Pro Ser Gly Pro Arg Gly Leu Pro Gly Pro Pro Gly
1               5                   10                  15

Val Pro Gly Pro Gln Gly Phe Gln Gly Pro Pro Gly Glu Pro Gly Glu
            20                  25                  30

Pro Gly Ile Ser Gly Pro Met Gly Pro Arg Gly Pro Pro Gly Pro Pro
        35                  40                  45

Gly Lys Asn Gly Asp Asp Gly Glu Ile Gly Lys Pro Gly Arg Pro Gly
50                  55                  60

Glu His Gly Pro Pro Gly Pro Gln Gly Leu Arg Gly Leu Pro Gly Thr
65                  70                  75                  80

Ala Gly Leu Pro Gly Met Lys Gly His Arg Gly Phe Ser Gly Leu Asp
                85                  90                  95

Gly Cys Lys Gly Asp Ala Gly Pro Ile Gly Pro Lys Gly Glu Pro Gly
            100                 105                 110

Ser Pro Gly Glu Asn Gly Ala Pro Gly His Met Gly Pro Arg Gly Leu
        115                 120                 125

Pro Gly Glu Arg Gly Arg Pro Gly Ile Pro Gly Pro Ala Gly Ala Arg
    130                 135                 140

Gly Phe Asp Gly Ala Thr Gly Ala Ala Gly Pro Pro Gly Pro Thr Gly
145                 150                 155                 160

Pro Leu Gly Pro Pro Gly Phe Pro Gly Ala Val Gly Ala Lys Gly Glu
                165                 170                 175

Gly Gly Pro Gln Gly Pro Arg Gly Thr Glu Gly Pro Gln Gly Val Arg
            180                 185                 190

Gly Glu Pro Gly Pro Pro Gly Pro Ala Gly Ala Trp Gly Pro Ala Gly
        195                 200                 205

Asn Pro Gly Ala Asp Gly Gln Pro Gly Ala Lys Gly Val Asn Gly Ala
    210                 215                 220

Pro Gly Ile Ala Gly Ala Pro Gly Phe Pro Gly Ala Arg Gly Pro Thr
225                 230                 235                 240

Gly Pro Phe Gly Pro Ser Gly Pro Pro Gly Lys Gly Tyr Ser Gly
                245                 250                 255

Glu Pro Gly Val Pro Gly Ser Lys Gly Asp Thr Gly Ala Lys Gly His
            260                 265                 270

Pro Gly Pro Thr Gly Ile Gln Gly Pro Pro Gly Pro Leu Gly Glu Glu
```

```
            275                 280                 285
Gly Lys Arg Gly Ala Arg Gly Glu Pro Gly Pro Ile Gly Leu Pro Gly
            290                 295                 300
Pro Pro Gly Glu Arg Gly Pro Gly Ser Arg Gly Phe Pro Gly Ile
305                 310                 315                 320
Asp Gly Val Ala Gly Pro Lys Gly Pro Ala Gly Tyr Arg Gly Ala Pro
                325                 330                 335
Gly Pro Ala Gly Pro Lys Gly Ser Pro Gly Glu Ala Gly Arg Pro Gly
            340                 345                 350
Glu Ala Gly Leu Pro Gly Ala Lys Gly Leu Thr Gly Tyr Pro Gly Ser
            355                 360                 365
Pro Gly Pro Asp Gly Lys Thr Gly Pro Pro Gly Pro Leu Gly Gln Asp
370                 375                 380
Gly Arg Pro Gly Pro Pro Gly Pro Pro Gly Ala Arg Gly His Ala Gly
385                 390                 395                 400
Val Met Gly Phe Pro Gly Pro Lys Gly Ile Ala Gly Glu Pro Gly Lys
                405                 410                 415
Leu Gly Glu Arg Gly Val Pro Gly Pro Pro Gly Ala Val Gly Pro Leu
            420                 425                 430
Gly Lys Asp Gly Glu Ala Gly Ala Gln Gly Pro Pro Gly Pro Ala Gly
            435                 440                 445
Pro Leu Gly Glu Arg Gly Glu Gln Gly Pro Ala Gly Ser Pro Gly Phe
450                 455                 460
Trp Gly Leu Pro Gly Pro Ala Gly Pro Pro Gly Tyr Ala Gly Lys Pro
465                 470                 475                 480
Gly Glu Gln Gly Val Pro Gly Asp Leu Gly Ala Pro Gly Pro Ser Gly
                485                 490                 495
Ile Arg Gly Glu Arg Gly Phe Pro Gly Glu Arg Gly Val Gln Gly Pro
            500                 505                 510
Pro Gly Pro Ala Gly Pro Tyr Gly Ala His Gly Ala Pro Gly Asn Asp
            515                 520                 525
Gly Leu Lys Gly Asp Ala Gly Ala Pro Gly Ala Pro Gly Ser Gln Gly
530                 535                 540
Ala Pro Gly Leu His Gly Met Pro Gly Glu Arg Gly Ala Ala Gly Leu
545                 550                 555                 560
Pro Gly Pro Lys Gly Asp Arg Gly Asp Leu Gly Pro Lys Gly Ala Asp
                565                 570                 575
Gly Ala Pro Gly Lys Asp Gly Val His Gly Leu Thr Gly Pro Ile Gly
            580                 585                 590
Pro Pro Gly Pro Ala Gly Ala Pro Gly Asp Lys Gly Glu Val Gly Pro
            595                 600                 605
Ser Gly Pro Ala Gly Pro Thr Gly Leu Arg Gly Ala Pro Gly Asp Arg
610                 615                 620
Gly Glu Pro Gly Pro Gly Pro Ala Gly Phe Ala Gly Pro Pro Gly
625                 630                 635                 640
Ala Asp Gly Gln Pro Gly Ala Lys Gly Glu Pro Gly Asp Trp Gly Ala
                645                 650                 655
Lys Gly Asp Ala Gly Pro Gly Pro Leu Gly Pro Ala Gly Pro Pro
            660                 665                 670
Gly Pro Ile Gly Asn Val Gly Ala Pro Gly Lys Gly Ala Arg Gly
            675                 680                 685
Thr Ala Gly Pro Pro Gly Ile Thr Gly Phe Pro Gly Met Ala Gly Tyr
            690                 695                 700
```

Val Gly Pro Pro Gly Pro Ser Gly Asn Ala Gly Pro Pro Gly Pro Pro
705                 710                 715                 720

Gly Pro Ala Gly Lys Glu Gly Tyr Lys Gly Pro Arg Gly Glu Thr Gly
            725                 730                 735

Pro Val Gly Arg Pro Gly Glu Val Gly Pro Pro Gly Pro Pro Gly Pro
        740                 745                 750

Ala Gly Glu Lys Gly Ala Pro Gly Ala Asp Gly Pro Ala Gly Leu Pro
        755                 760                 765

Gly Thr Pro Gly Pro Trp Gly Ile Ala Gly Gln His Gly Val Val Gly
        770                 775                 780

Leu Pro Gly Phe Arg Gly His Arg Gly Phe Pro Gly Leu Pro Gly Pro
785                 790                 795                 800

Ser Gly Glu Pro Gly Lys His Gly Pro Ser Gly Ala Ser Gly Glu Phe
            805                 810                 815

Gly Pro Pro Gly Pro Met Gly Pro Pro Gly Leu Ala Gly Pro Pro Gly
            820                 825                 830

Glu Ser Gly Arg Glu Gly Ala Pro Gly Leu Glu Gly Ser Pro Gly Arg
            835                 840                 845

Asp Gly Cys Pro Gly Ala Lys Gly Asp Arg Gly Phe Thr Gly Pro Ala
850                 855                 860

Gly Pro Pro Gly Ala Pro Gly Ala Pro Gly Ala Pro Gly Pro Val Gly
865                 870                 875                 880

Pro Ala Gly Lys Cys Gly Asp Arg Gly Glu Thr Gly Pro Leu Gly Pro
            885                 890                 895

Ala Gly Pro Ile Gly Pro Val Gly Ala Arg Gly Pro Leu Gly Pro Gln
            900                 905                 910

Gly Pro Arg Gly Asp Lys Gly Glu Thr Gly Glu Phe Gly Asp Arg Gly
            915                 920                 925

Ile Lys Gly His Tyr Gly Phe Ser Gly Leu Gln Gly Pro Pro Gly Pro
            930                 935                 940

Pro Gly Ser Pro Gly Glu Gln Gly Pro Tyr Gly Ala Ser Gly Pro Ala
945                 950                 955                 960

Gly Pro Arg Gly Pro Gly Ser Ala Gly Ser Pro Gly Lys Asp Gly
            965                 970                 975

Leu Phe Gly Leu Pro Gly Pro Ile Gly Pro Pro Gly Pro Arg Gly Arg
            980                 985                 990

Thr Gly Asp Ala Gly Pro Leu Gly  Pro Pro Gly Pro Pro  Gly Pro Pro
            995                 1000                1005

Gly Pro  Pro Gly Pro Pro
    1010

<210> SEQ ID NO 27
<211> LENGTH: 507
<212> TYPE: PRT
<213> ORGANISM: Artificial sequence
<220> FEATURE:
<223> OTHER INFORMATION: Synthetic collagen sequence

<400> SEQUENCE: 27

Gly Pro Met Gly Pro Ser Gly Pro Arg Gly Leu Pro Gly Pro Pro Gly
1               5                   10                  15

Val Pro Gly Pro Gln Gly Phe Gln Gly Pro Pro Gly Glu Pro Gly Glu
            20                  25                  30

Pro Gly Ile Ser Gly Pro Met Gly Pro Arg Gly Pro Pro Gly Pro Pro
        35                  40                  45

-continued

```
Gly Lys Asn Gly Asp Asp Gly Glu Ile Gly Lys Pro Gly Arg Pro Gly
    50                  55                  60

Glu His Gly Pro Pro Gly Pro Gln Gly Leu Arg Gly Leu Pro Gly Thr
65                  70                  75                  80

Ala Gly Leu Pro Gly Met Lys Gly His Arg Gly Phe Ser Gly Leu Asp
                85                  90                  95

Gly Cys Lys Gly Asp Ala Gly Pro Ile Gly Pro Lys Gly Glu Pro Gly
                100                 105                 110

Ser Pro Gly Glu Asn Gly Ala Pro Gly His Met Gly Pro Arg Gly Leu
            115                 120                 125

Pro Gly Glu Arg Gly Arg Pro Gly Ile Pro Gly Pro Ala Gly Ala Arg
    130                 135                 140

Gly Phe Asp Gly Ala Thr Gly Ala Ala Gly Pro Pro Gly Pro Thr Gly
145                 150                 155                 160

Pro Leu Gly Pro Pro Gly Phe Pro Gly Ala Val Gly Ala Lys Gly Glu
                165                 170                 175

Gly Gly Pro Gln Gly Pro Arg Gly Thr Glu Gly Pro Gln Gly Val Arg
                180                 185                 190

Gly Glu Pro Gly Pro Pro Gly Pro Ala Gly Ala Trp Gly Pro Ala Gly
            195                 200                 205

Asn Pro Gly Ala Asp Gly Gln Pro Gly Ala Lys Gly Val Asn Gly Ala
    210                 215                 220

Pro Gly Ile Ala Gly Ala Pro Gly Phe Pro Gly Ala Arg Gly Pro Thr
225                 230                 235                 240

Gly Pro Phe Gly Pro Ser Gly Pro Pro Gly Pro Lys Gly Tyr Ser Gly
                245                 250                 255

Glu Pro Gly Val Pro Gly Ser Lys Gly Asp Thr Gly Ala Lys Gly His
                260                 265                 270

Pro Gly Pro Thr Gly Ile Gln Gly Pro Pro Gly Pro Leu Gly Glu Glu
            275                 280                 285

Gly Lys Arg Gly Ala Arg Gly Glu Pro Gly Pro Ile Gly Leu Pro Gly
    290                 295                 300

Pro Pro Gly Glu Arg Gly Gly Pro Gly Ser Arg Gly Phe Pro Gly Ile
305                 310                 315                 320

Asp Gly Val Ala Gly Pro Lys Gly Pro Ala Gly Tyr Arg Gly Ala Pro
                325                 330                 335

Gly Pro Ala Gly Pro Lys Gly Ser Pro Gly Glu Ala Gly Arg Pro Gly
                340                 345                 350

Glu Ala Gly Leu Pro Gly Ala Lys Gly Leu Thr Gly Tyr Pro Gly Ser
            355                 360                 365

Pro Gly Pro Asp Gly Lys Thr Gly Pro Pro Gly Pro Leu Gly Gln Asp
    370                 375                 380

Gly Arg Pro Gly Pro Pro Gly Pro Pro Gly Ala Arg Gly His Ala Gly
385                 390                 395                 400

Val Met Gly Phe Pro Gly Pro Lys Gly Ile Ala Gly Glu Pro Gly Lys
                405                 410                 415

Leu Gly Glu Arg Gly Val Pro Gly Pro Pro Gly Ala Val Gly Pro Leu
                420                 425                 430

Gly Lys Asp Gly Glu Ala Gly Ala Gln Gly Pro Pro Gly Pro Ala Gly
            435                 440                 445

Pro Leu Gly Glu Arg Gly Glu Gln Gly Pro Ala Gly Ser Pro Gly Phe
    450                 455                 460
```

```
Trp Gly Leu Pro Gly Pro Ala Gly Pro Pro Gly Tyr Ala Gly Lys Pro
465                 470                 475                 480

Gly Glu Gln Gly Val Pro Gly Asp Leu Gly Ala Pro Gly Pro Ser Gly
            485                 490                 495

Ile Arg Gly Glu Arg Gly Phe Pro Gly Glu Arg
            500                 505

<210> SEQ ID NO 28
<211> LENGTH: 507
<212> TYPE: PRT
<213> ORGANISM: Artificial sequence
<220> FEATURE:
<223> OTHER INFORMATION: Synthetic collagen sequence

<400> SEQUENCE: 28

Gly Val Gln Gly Pro Pro Gly Ala Gly Pro Tyr Gly Ala His Gly
1               5                   10                  15

Ala Pro Gly Asn Asp Gly Leu Lys Gly Asp Ala Gly Ala Pro Gly Ala
                20                  25                  30

Pro Gly Ser Gln Gly Ala Pro Gly Leu His Gly Met Pro Gly Glu Arg
            35                  40                  45

Gly Ala Ala Gly Leu Pro Gly Pro Lys Gly Asp Arg Gly Asp Leu Gly
50                  55                  60

Pro Lys Gly Ala Asp Gly Ala Pro Gly Lys Asp Gly Val His Gly Leu
65                  70                  75                  80

Thr Gly Pro Ile Gly Pro Pro Gly Pro Ala Gly Ala Pro Gly Asp Lys
                85                  90                  95

Gly Glu Val Gly Pro Ser Gly Pro Ala Gly Pro Thr Gly Leu Arg Gly
            100                 105                 110

Ala Pro Gly Asp Arg Gly Glu Pro Gly Pro Pro Gly Pro Ala Gly Phe
            115                 120                 125

Ala Gly Pro Pro Gly Ala Asp Gly Gln Pro Gly Ala Lys Gly Glu Pro
130                 135                 140

Gly Asp Trp Gly Ala Lys Gly Asp Ala Gly Pro Pro Gly Pro Leu Gly
145                 150                 155                 160

Pro Ala Gly Pro Pro Gly Pro Ile Gly Asn Val Gly Ala Pro Gly Pro
                165                 170                 175

Lys Gly Ala Arg Gly Thr Ala Gly Pro Pro Gly Ile Thr Gly Phe Pro
            180                 185                 190

Gly Met Ala Gly Tyr Val Gly Pro Gly Pro Ser Gly Asn Ala Gly
            195                 200                 205

Pro Pro Gly Pro Gly Pro Ala Gly Lys Glu Gly Tyr Lys Gly Pro
210                 215                 220

Arg Gly Glu Thr Gly Pro Val Gly Arg Pro Gly Glu Val Gly Pro Pro
225                 230                 235                 240

Gly Pro Pro Gly Pro Ala Gly Glu Lys Gly Ala Pro Gly Ala Asp Gly
                245                 250                 255

Pro Ala Gly Leu Pro Gly Thr Pro Gly Pro Trp Gly Ile Ala Gly Gln
            260                 265                 270

His Gly Val Val Gly Leu Pro Gly Phe Arg Gly His Arg Gly Phe Pro
            275                 280                 285

Gly Leu Pro Gly Pro Ser Gly Glu Pro Gly Lys His Gly Pro Ser Gly
290                 295                 300

Ala Ser Gly Glu Phe Gly Pro Pro Gly Pro Met Gly Pro Pro Gly Leu
305                 310                 315                 320
```

```
-continued

Ala Gly Pro Pro Gly Glu Ser Gly Arg Glu Gly Ala Pro Gly Leu Glu
            325                 330                 335

Gly Ser Pro Gly Arg Asp Gly Cys Pro Gly Ala Lys Gly Asp Arg Gly
            340                 345                 350

Phe Thr Gly Pro Ala Gly Pro Pro Gly Ala Pro Gly Ala Pro Gly Ala
        355                 360                 365

Pro Gly Pro Val Gly Pro Ala Gly Lys Cys Gly Asp Arg Gly Glu Thr
    370                 375                 380

Gly Pro Leu Gly Pro Ala Gly Pro Ile Gly Pro Val Gly Ala Arg Gly
385                 390                 395                 400

Pro Leu Gly Pro Gln Gly Pro Arg Gly Asp Lys Gly Glu Thr Gly Glu
            405                 410                 415

Phe Gly Asp Arg Gly Ile Lys Gly His Tyr Gly Phe Ser Gly Leu Gln
            420                 425                 430

Gly Pro Pro Gly Pro Pro Gly Ser Pro Gly Glu Gln Gly Pro Tyr Gly
            435                 440                 445

Ala Ser Gly Pro Ala Gly Pro Arg Gly Pro Pro Gly Ser Ala Gly Ser
    450                 455                 460

Pro Gly Lys Asp Gly Leu Phe Gly Leu Pro Gly Pro Ile Gly Pro Pro
465                 470                 475                 480

Gly Pro Arg Gly Arg Thr Gly Asp Ala Gly Pro Leu Gly Pro Pro Gly
            485                 490                 495

Pro Pro Gly Pro Pro Gly Pro Pro Gly Pro Pro
            500                 505
```